US012712614B2

(12) United States Patent
Venugopal et al.

(10) Patent No.: US 12,712,614 B2
(45) Date of Patent: Aug. 18, 2026

(54) MULTIPLE TRANSMISSION AND RECEPTION POINT COHERENT JOINT TRANSMISSION CHANNEL STATE INFORMATION FEEDBACK

(71) Applicant: QUALCOMM Incorporated, San Diego, CA (US)

(72) Inventors: Kiran Venugopal, Green Brook, NJ (US); Wooseok Nam, San Diego, CA (US); Junyi Li, Fairless Hills, PA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 541 days.

(21) Appl. No.: 18/180,729

(22) Filed: Mar. 8, 2023

(65) Prior Publication Data

US 2024/0305343 A1 Sep. 12, 2024

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01); *H04L 5/006* (2013.01)

(58) Field of Classification Search
CPC .... H04B 7/0626; H04B 7/0695; H04B 7/088; H04B 7/063; H04B 7/024; H04L 5/0048; H04L 5/006

(Continued)

(56) References Cited

U.S. PATENT DOCUMENTS

2022/0167126 A1* 5/2022 Baek .................. H04L 12/1822
2022/0183000 A1 6/2022 Bai et al.
2023/0344488 A1* 10/2023 Bhat .................. H04B 7/0626

FOREIGN PATENT DOCUMENTS

WO WO-2024036205 A2 * 2/2024 ............ H04B 7/024

OTHER PUBLICATIONS

Interdigital, Inc: "Enhanced CSI for CJT and High Doppler Operations", 3GPP TSG RAN WG1 #110bis-e, R1-2208495, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 9 Pages, XP052276421, Sections 3-4.

(Continued)

*Primary Examiner* — Chandrahas B Patel
*Assistant Examiner* — Meheret Woldegebreal Kidane
(74) *Attorney, Agent, or Firm* — Shumaker & Sieffert, P.A.

(57) ABSTRACT

An example wireless communication device includes one or more processors, one or more transceivers, and memory. The one or more processors are configured to cause the wireless communication device to receive a respective reference signal from each of a plurality of transmission reception points (TRPs). The one or more processors are configured to cause the wireless communication device to transmit a first message comprising a recommended set of TRPs from among the plurality of TRPs for use in coherent joint transmission (CJT) based on the respective reference signals. The one or more processors are configured to transmit a second message comprising a channel state information (CSI) report based on a transmission hypothesis. The transmission hypothesis is based on the recommended set of TRPs or an override set of TRPs from among the plurality of TRPs for use in CJT.

30 Claims, 12 Drawing Sheets

(58) Field of Classification Search
USPC .......................................................... 370/252
See application file for complete search history.

(56) References Cited

OTHER PUBLICATIONS

International Search Report and Written Opinion—PCT/US2024/014769—ISA/EPO—Jun. 25, 2024 18 Pages.

Nangia V (Lenovo)., et al., "Network Energy Saving Techniques in Spatial and Power Domains", 3GPP TSG RAN WG1 #112, R1-2301206, Type Discussion, NETW_ENERGY_NR-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 10 Pages, XP052248344, Sections 2-3.

Spreadtrum Communications: "Discussion on CSI Enhancement for High/medium UE Velocities and Coherent JT", 3GPP TSG RAN WG1 #110bis-e, R1-2208541, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 7 Pages, XP052276461, Section 2.

* cited by examiner

MULTIPLE TRANSMISSION AND RECEPTION POINT COHERENT JOINT TRANSMISSION CHANNEL STATE INFORMATION FEEDBACK

TECHNICAL FIELD

This disclosure relates generally to wireless communication systems, and more particularly, to multiple Transmission and Reception (mTRP) coherent joint transmission (CJT) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some wireless communications systems, such as 5G systems, may support channel state information (CSI) operations and may also support multiple Transmission and Reception Point (mTRP) coherent joint transmission (CJT) operations.

As the demand for mobile broadband access continues to increase, research and development continue to advance wireless communication technologies not only to meet the growing demand for mobile broadband access, but to advance and enhance the user experience with mobile communications.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. Unless expressly described, no one aspect or feature is essential to achieve technical effects or solutions discussed herein.

An example method of wireless communication operable at a user equipment (UE) includes: receiving a respective reference signal from each of a plurality of transmission reception points (TRPs); transmitting a first message comprising a recommended set of TRPs from among the plurality of TRPs for use in coherent joint transmission (CJT) based on the respective reference signals; and transmitting a second message comprising a channel state information (CSI) report based on a transmission hypothesis, wherein the transmission hypothesis is based on the recommended set of TRPs or an override set of TRPs from among the plurality of TRPs for use in CJT.

An example method of wireless communication at a network node includes: transmitting a respective reference signal from each of a plurality of transmission reception points (TRPs); receiving a first message comprising a recommended set of TRPs from among the plurality of TRPs for use in coherent joint transmission (CJT) based on the respective reference signals; receiving a second message comprising a channel state information (CSI) report based on a transmission hypothesis corresponding to the recommended set of TRPs or an override set of TRPs from among the plurality of TRPs for use in CJT; and initiating multiple TRP (mTRP) CJT communication with a user equipment (UE) based on the second message.

An example wireless communication device includes: one or more processors; one or more transceivers coupled to the one or more processors; and memory coupled to the one or more processors, wherein the one or more processors are configured to cause the wireless communication device to: receive a respective reference signal from each of a plurality of transmission reception points (TRPs); transmit a first message comprising a recommended set of TRPs from among the plurality of TRPs for use in coherent joint transmission (CJT) based on the respective reference signals; and transmit a second message comprising a channel state information (CSI) report based on a transmission hypothesis, wherein the transmission hypothesis is based on the recommended set of TRPs or an override set of TRPs from among the plurality of TRPs for use in CJT.

An example network node for wireless communication includes: one or more processors; one or more transceivers coupled to the one or more processors; and memory coupled to the one or more processors, wherein the one or more processors are configured to cause the network node to: transmit a respective reference signal from each of a plurality of transmission reception points (TRPs); receive a first message comprising a recommended set of TRPs from among the plurality of TRPs for use in coherent joint transmission (CJT) based on the respective reference signals; receive a second message comprising a channel state information (CSI) report based on a transmission hypothesis corresponding to the recommended set of TRPs or an override set of TRPs from among the plurality of TRPs for use in CJT; and initiate multiple TRP (mTRP) CJT communication with a user equipment (UE) based on the second message.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

DETAILED DESCRIPTION

Figure 1:
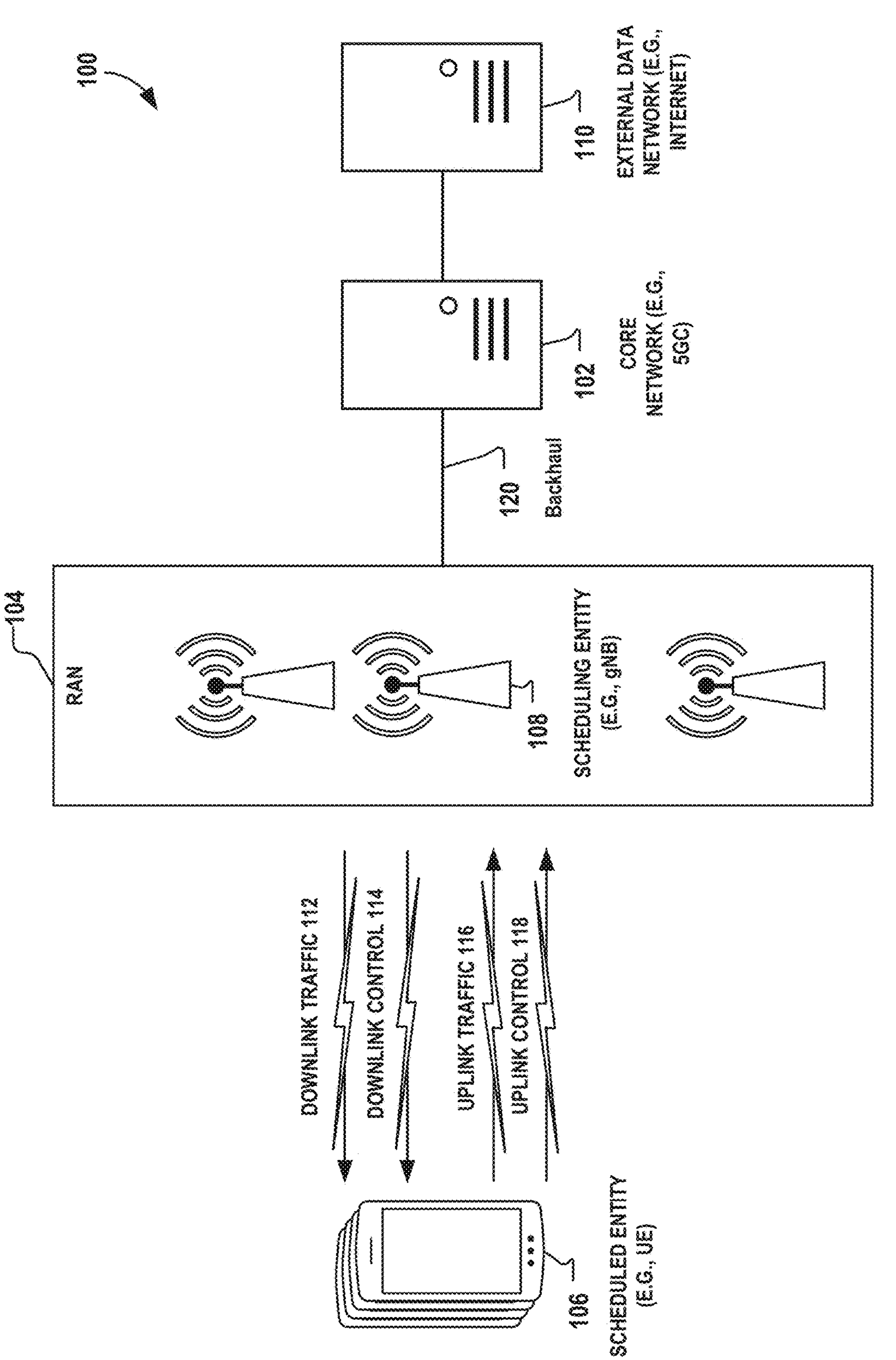
FIG. 1 is a schematic illustration of a wireless communication system according to some aspects of this disclosure.

An mTRP CJT codebook refers, in a general way, to the signaling and control techniques between a UE and a network node to coordinate CSI reporting in mTRP CJT communication. The base station may be next-generation NodeBs or giga-NodeBs (either of which may be referred to as a gNB). There are two types of codebooks: Type I and Type II. In 3GPP Specifications for 5G NR (New Radio), Type-II CSI refers to a set of precoders that provide improved throughput relative to a Type-I CSI precoder.

Coordinated Multipoint (COMP) communication is type of network communication where a user equipment (UE) may communicate with multiple transmission/reception points (TRPs) at the same time. That is, the UE may communicate with multiple TRPs that operate in a coordinated manner by exchanging information between one another. One form of COMP is coherent joint transmission (CJT). With CJT a network performs joint beamforming from a plurality of coordinated TRPs. For example, CJT communication may include the use of multiple TRPs (mTRPs).

As described herein, channel state information (CSI) may be used to support mTRP CJT operations. A number of TRPs may participate in CJT with a given UE, for example, in a 5G network. Various mechanisms may be used to set up CJT using a number of TRPs which may have drawbacks.

3GPP agreed to include mTRP CJT codebook refinement in 5G NR in Release 18. This refinement allows up to four (4) TRPs to participate in CJT, such that the maximum value of a variable $N_{TRP}=4$. N represents the number of cooperating TRPs assumed in precoding matrix indicator (PMI) reporting. $N_{TRP}$ may be signaled via radio resource control (RRC) by a network element. Two alternatives are set forth for codebook refinement. In the first alternative, Nis gNB-configured via higher-layer (RRC) signaling. The N configured TRPs are gNB-configured via higher-layer (RRC) signaling and only one transmission hypothesis is reported, for example, by the UE. In the second alternative, N is UE-selected and reported as a part of a CSI report where N E$\{1, \ldots, N_{TRP}\}$, where N is the number of cooperating TRPs and $N_{TRP}$ is the maximum number of potential cooperating TRPs configured by gNB. In this case, the selection of N out of $N_{TRP}$ TRPs may also be reported. As in the first alternative, only one transmission hypothesis is reported, for example, by the UE, and the UE need not calculate CSI for multiple transmission hypotheses.

However, with the first alternative, it is unclear how the gNB selects N and indicates the selection of N to the UE. For example, the gNB may select N based on heuristics or based on some gNB-side implementation. The gNB may not have proper or appropriate channel knowledge to make an appropriate selection of N, as the gNB may not have CSI information related to each of the possible transmission hypotheses. Therefore, the selection of N may be sub-optimal. However, one advantage of the first alternative is that uplink control information (UCI) overhead may be better characterized than with the second alternative. For example, the CSI feedback may have a gNB-known number of bits in a gNB-known format.

The second alternative also has drawbacks. With the second alternative, even if the UE selects and reports a PMI for N TRPs/TRP groups, along with an indication of which N TRPs are to be utilized for the CJT, it is left to the gNB to follow (or not) the UE report. Feedback overhead may vary, and inter-TRP/cell interference may fluctuate. For example, if the UE selects a large value of N, the feedback overhead would be higher, and the resource allocation for sending that feedback information may change. Also, depending on how the UE selects, the effective inter-TRP or inter-cell interference caused by that selection could fluctuate and that might cause some issues for the gNB. Thus, the UE-selected TRPs may be sub-optimal. However, an advantage of the second alternative is that the UE may leverage better knowledge of the channel conditions and may be in a better position to determine the best combination of TRPs for the UE's downlink.

It should be noted that even under the second alternative, when the UE is reporting PMI values to the gNB, there is the assumption that the UE will transmit a CSI report based on a single assumed value for N. So the UE may report an assumed value for N that the UE uses when computing and reporting the CSI. In a given UE implementation, a UE may determine alternative transmission hypotheses, but CSI reporting, according to existing 3GPP specifications, only supports one transmission hypothesis in a CSI report. Given N TRPs, there may be several different subsets of N TRPs that could be formed.

In either the first alternative or second alternative, CSI-reference signals (CSI-RSs) may be configured per TRP/TRP groups. For example, a channel measurement resource (CMR) comprises K>1 non-zero power (NZP) CSI-RS resources, where one resource corresponds to one TRP/TRP-group (e.g., $K=N_{TRP}$) and each of the CSI-RS resources has a same number of CSI-RS ports. A gNB may configure the CSI-RS resource for each TRP. The UE may base its indication in Alternative 2 based on those CSI measurements.

As such, an enhanced signaling mechanism may be desirable for CSI feedback and codebook refinement for mTRP CJT that may address the drawbacks in both the first and second alternatives described above, while leveraging the advantages of both. The techniques disclosed herein try to capture the best of these alternatives, reduce overhead, and use the UE's channel knowledge to make a recommendation of the TRPs to be used for CJT to the gNB.

The techniques of this disclosure may overcome the above drawbacks of the example techniques for selecting the number of TRPs and/or which TRPs to use for mTRP CJT operations. Various aspects of the techniques of this disclosure relate to a signaling mechanism for mTRP CJT. For example, the techniques may provide for a UE to receive reference signals from TRPs. The UE may determine a recommended set of TRPs from the TRPs for use in CJT. For example, the UE may analyze the reference signals to determine a preferred set of TRPs to use for CJT. The UE may transmit a message including the recommended set of TRPs to a network node, such as a gNB. The gNB may transmit an ACK/NACK, a number of TRPs and/or override set of TRPs to the UE. The UE may send a CSI report with a CJT involving N TRPs transmit hypothesis based on the recommended set of TRPs or the override set of TRPs. As such, the techniques of this disclosure may enable a network to take advantage of the benefits of both the first and second alternative described above while avoiding the drawbacks discussed above.

FIG. 1 is a schematic illustration of a wireless communication system according to some aspects of this disclosure. The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (CUTRAN) standards, often referred to as Long Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of network nodes 108. Broadly, a network node is a network element in a radio access network responsible for radio transmission and reception in one or more cells to or from a UE. In different technologies, standards, or contexts, those skilled in the art may variously refer to a "network node" as a base station, a base transceiver station (BTS), a radio base station, a radio transceiver, a transceiver function, a basic service set (BSS), an extended service set (ESS), an access point (AP), a Node B (NB), an evolved Node B (cNB), a gNode B (gNB), a 5G NB, a transmission reception point (TRP), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface, or may indirectly communicate with one another over a network (e.g., a local area network or LAN).

Wireless communication between a RAN 104 and a UE 106 may be described as utilizing an air interface. Transmissions over the air interface from a base station (e.g., network node 108) to one or more UEs (e.g., the UE 106) may be referred to as downlink (DL) transmission. In accordance with certain aspects of the present disclosure, the term downlink may refer to a point-to-multipoint transmission originating at a scheduling entity (described further below; e.g., the network node 108). Another way to describe this scheme may be to use the term broadcast channel multiplexing. Transmissions from a UE (e.g., the UE 106) to a base station (e.g., the network node 108) may be referred to as uplink (UL) transmissions. In accordance with further aspects of the present disclosure, the term uplink may refer to a point-to-point transmission originating at a scheduled entity (described further below; e.g., the UE 106).

In some examples, access to the air interface may be scheduled, wherein a scheduling entity (e.g., the network node 108) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by a scheduling entity such as network node 108.

Network nodes and base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node 108 may broadcast downlink traffic 112 to one or more UEs 106. Broadly, the network node 108 is a node or device responsible for scheduling traffic in a wireless communication network, including downlink traffic 112 and, in some examples, uplink traffic 116 from one or more UEs 106 to the network node 108. On the other hand, the UE 106 is a node or device that receives downlink control information 114, including but not limited to scheduling information (e.g., a grant), synchronization or timing information, or other control information from another entity in the wireless communication network such as the network node 108.

In general, network nodes 108 may include a backhaul interface for communication with a backhaul portion 120 of the wireless communication system. The backhaul 120 may provide a link between a network node 108 and the core network 102. Further, in some examples, a backhaul network may provide interconnection between the respective network nodes 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some examples, the scheduling entity 108 may include multiple transmission and reception points (mTRPs) (not shown in FIG. 1). In some examples, wireless communication between the scheduling entity 108 and the UE 106 may include coherent joint transmission (CJT) using the mTRPs. In some examples, the scheduling entity 108 and the UE 106 may use the techniques for mTRP CJT discussed herein.

For example, UE 106 may receive a respective reference signal from each of a plurality of TRPs. UE 106 may transmit a first message comprising a recommended set of TRPs from among the plurality of TRPs for use in CJT based on the respective reference signals. UE 106 may determine whether to base a transmission hypothesis on the recommended set of TRPs or an override set of TRPs from among the plurality of TRPs for use in CJT. UE 106 may transmit a second message comprising a CSI report based on the transmission hypothesis. For example, scheduling entity 108 may transmit a respective reference signal from each of a plurality of TRPs. Scheduling entity 108 may receive a first message comprising a recommended set of TRPs from among the plurality of TRPs for use in CJT based on the respective reference signals. Scheduling entity 108 may receive a second message comprising a CSI report based on a transmission hypothesis corresponding to the recommended set of TRPs or an override set of TRPs from among the plurality of TRPs for use in CJT. Scheduling entity 108 may initiate mTRP CJT communication with UE 106 based on the second message.

Figure 2:
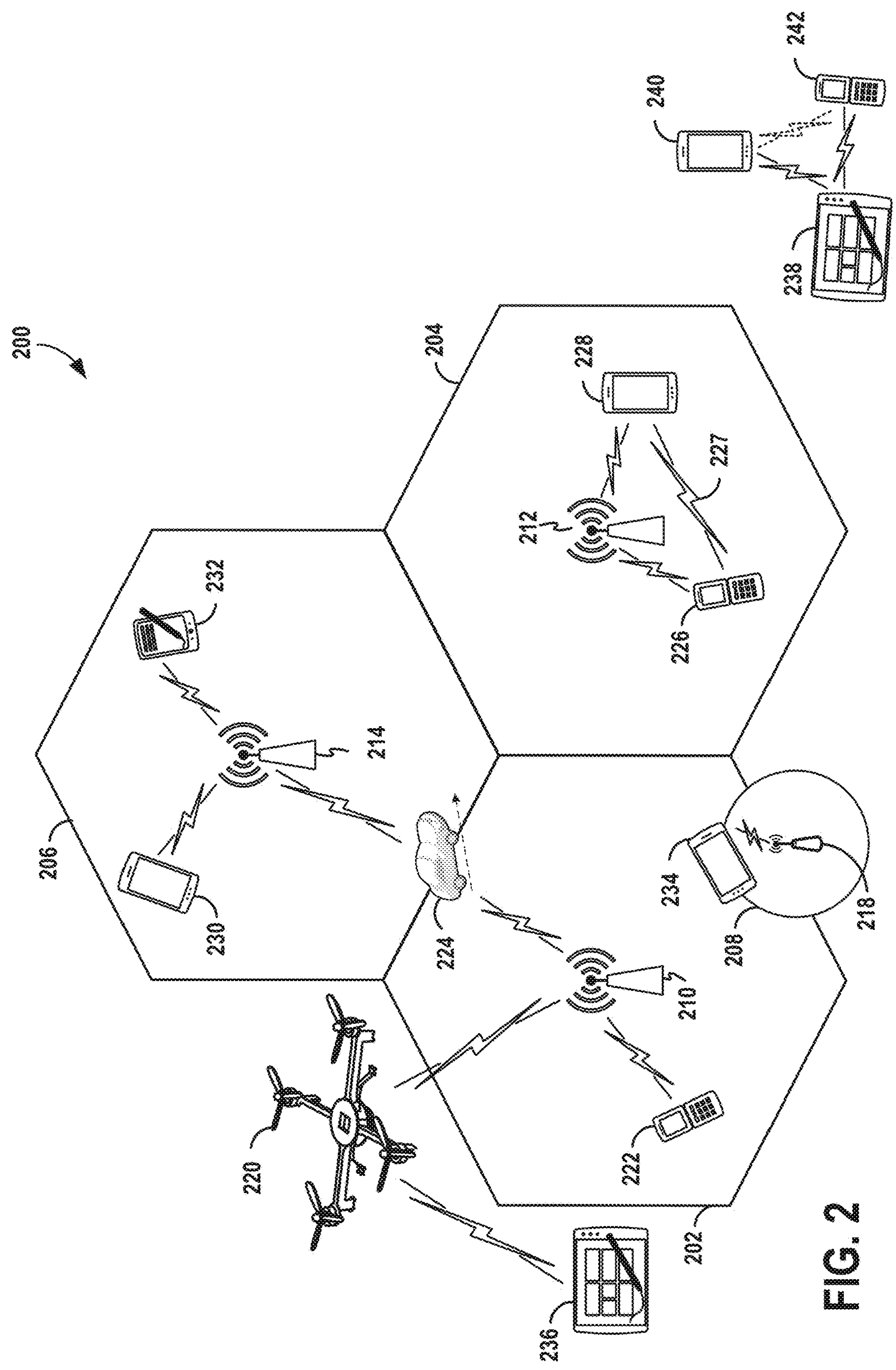
FIG. 2 is a conceptual illustration of an example of a radio access network according to some aspects of this disclosure.

FIG. 2 is a conceptual illustration of an example of a radio access network according to some aspects of this disclosure. FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a UE can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, the cells 202, 204, and 206 may be referred to as macrocells, as the network nodes 210, 212, and 214 support cells having a relatively large size. Further, a network node 218 is shown in the small cell 208 (e.g., a microcell, picocell, femtocell, home base station, home Node B, home eNode B, etc.) which may overlap with one or more macrocells. In this example, the cell 208 may be referred to as a small cell, as the network node 218 supports a cell having a relatively small size. Cell sizing can be done according to system design as well as component constraints.

The RAN 200 may include any number of wireless network nodes and cells. Further, a RAN may include a relay node to extend the size or coverage area of a given cell. The network nodes 210, 212, 214, 218 provide wireless access points to a core network for any number of mobile apparatuses. In some examples, the network nodes 210, 212, 214, and/or 218 may be the same as the network node 108 described above and illustrated in FIG. 1.

Some examples of a RAN 200 may include one or more cells (corresponding to a given cell ID) that utilize coordinated multi-point (CoMP) communication via multiple transmission and reception points (mTRP). This scheme generally involves dynamic coordination among multiple geographically separated TRPs to provide spatial diversity to one or both of UL and/or DL communication, and to improve communication performance at a cell edge. In a COMP example, a cell may include two or more TRPs that are generally not collocated, and are physically at different positions. However, those two or more TRPs in a given cell share the same cell ID. Thus, a RAN 400 may support transmission to, and/or reception from, a single UE from multiple TRPs in a given cell. In some examples, the CoMP communication may include mTRP CJT communication, which may include simultaneous transmission from multiple TRPs to the same UE.

FIG. 2 further includes a quadcopter or drone 220, which may be configured to function as a network node. That is, in some examples, a cell may not necessarily be stationary, and the geographic area of the cell may move according to the location of a mobile network node such as the quadcopter 220.

Within the RAN 200, each network node 210, 212, 214, 218, and 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with mobile network node 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with network node 210.

In a further aspect of the RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Wireless communication between a network node (e.g., any of network nodes 210, 212, 214, 218, or 220) and a UE may include coherent joint transmission (CJT) using the mTRPs. In some examples, the network node and the UE may use the signaling techniques for mTRP CJT discussed herein.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (cNB), NR BS, 5G NB, gNB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
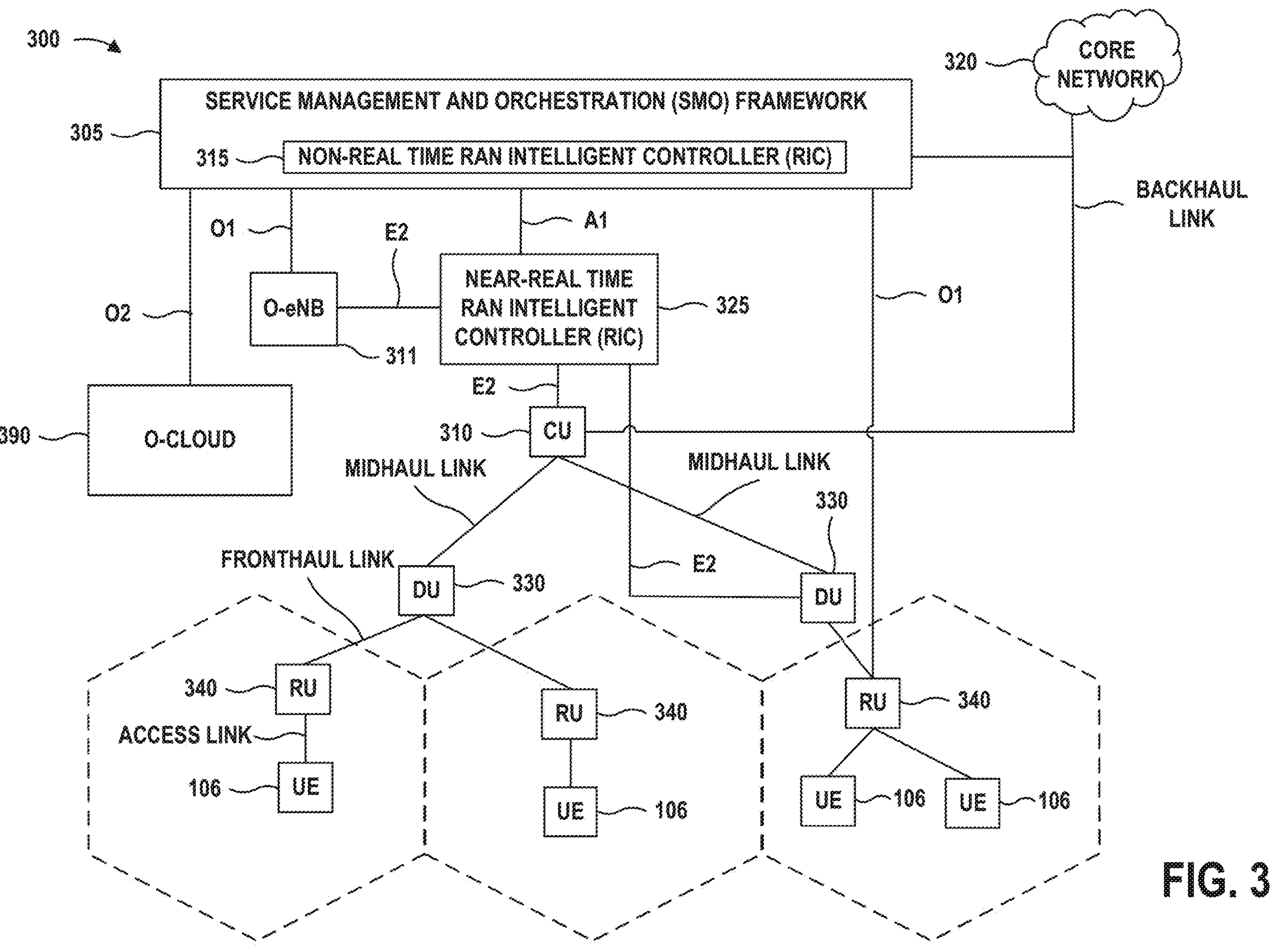
FIG. 3 is a diagram illustrating an example disaggregated base station architecture according to some aspects of this disclosure.

FIG. 3 is a diagram illustrating an example disaggregated base station architecture according to some aspects of this disclosure. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. In some examples, the RUs 340 may include TRPs or be referred to as TRPs. The RUs 340 may communicate with respective UEs 106 via one or more radio frequency (RF) access links. In some implementations, the UE 106 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 106. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUS 340 and Near-RT RICs 325. In some implementations, the SMO Framework 305 can communicate with a hardware aspect of a 4G RAN, such as an open eNB (O-CNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
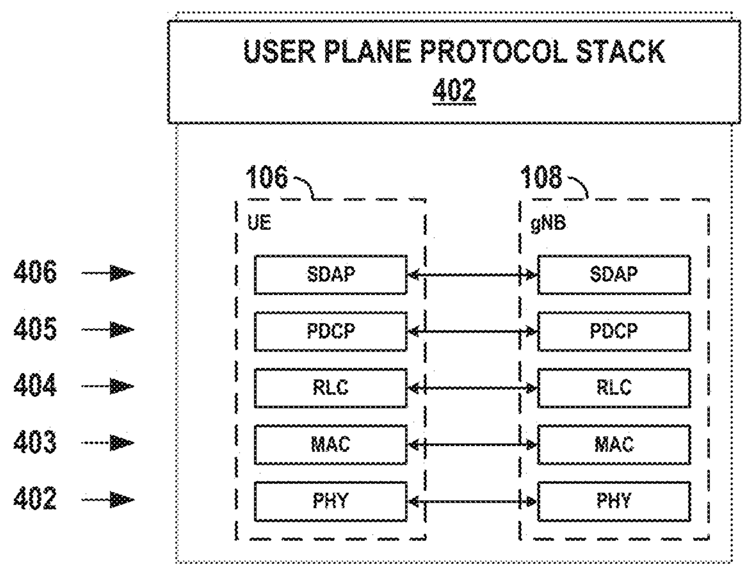
FIG. 4 is a schematic illustration of a user plane protocol stack and a control plane protocol stack in accordance with some aspects of this disclosure.
Figure 4:
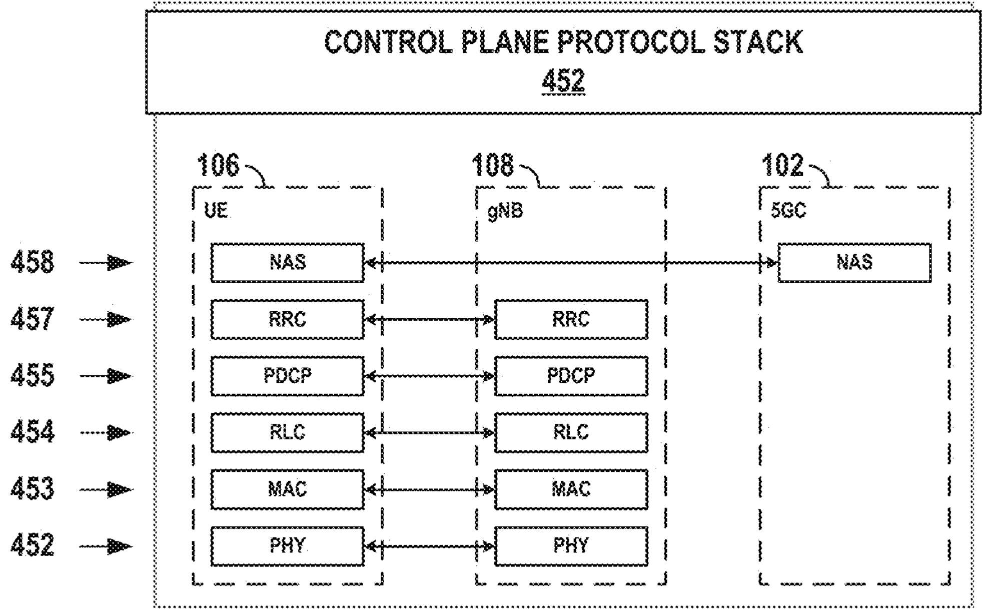

FIG. 4 is a schematic illustration of a user plane protocol stack and a control plane protocol stack in accordance with some aspects of this disclosure. In a wireless telecommunication system, the communication protocol architecture may take on various forms depending on the application. For example, in a 3GPP NR system, the signaling protocol stack is divided into Non-Access Stratum (NAS, 458) and Access Stratum (AS, 402-406 and 452-457) layers and protocols. The NAS protocol 458 provides upper layers, for signaling between a UE 106 and a core network 102 (referring to FIG. 1). The AS protocol 402-406 and 452-457 provides lower layers, for signaling between the RAN 104 (e.g., a gNB or other network node 108) and the UE 106.

Turning to FIG. 4, a radio protocol architecture is illustrated with a user plane protocol stack 402 and a control plane protocol stack 452, showing their respective layers or sublayers. Radio bearers between a network node 108 and a UE 106 may be categorized as data radio bearers (DRB) for carrying user plane data, corresponding to the user plane protocol 402; and signaling radio bearers (SRB) for carrying control plane data, corresponding to the control plane protocol 452.

In the AS, both the user plane 402 and control plane 452 protocols include a physical layer (PHY) 402/452, a medium access control layer (MAC) 403/453, a radio link control layer (RLC) 404/454, and a packet data convergence protocol layer (PDCP) 405/455. PHY 402/452 is the lowest layer and implements various physical layer signal processing functions. The MAC layer 403/453 provides multiplexing between logical and transport channels and is responsible for various functions. For example, the MAC layer 403/453 is responsible for reporting scheduling information, priority handling and prioritization, and error correction through hybrid automatic repeat request (HARQ) operations. The RLC layer 404/454 provides functions such as sequence numbering, segmentation and reassembly of upper layer data packets, and duplicate packet detection. The PDCP layer 405/455 provides functions including header compression for upper layer data packets to reduce radio transmission overhead, security by ciphering the data packets, and integrity protection and verification.

In the user plane protocol stack 402, a service data adaptation protocol (SDAP) layer 406 provides services and functions for maintaining a desired quality of service (QoS). And in the control plane protocol stack 452, a radio resource control (RRC) layer 457 includes a number of functional entities for routing higher layer messages, handling broadcasting and paging functions, establishing and configuring radio bearers, NAS message transfer between NAS and UE, etc. In some examples, a UE may signal a recommended number N of TRPs to be used for mTRP CJT communication to a gNB via RRC.

A NAS protocol layer 458 provides for a wide variety of control functions between the UE 106 and core network 102. These functions include, for example, registration management functionality, connection management functionality, and user plane connection activation and deactivation.

Figure 5:
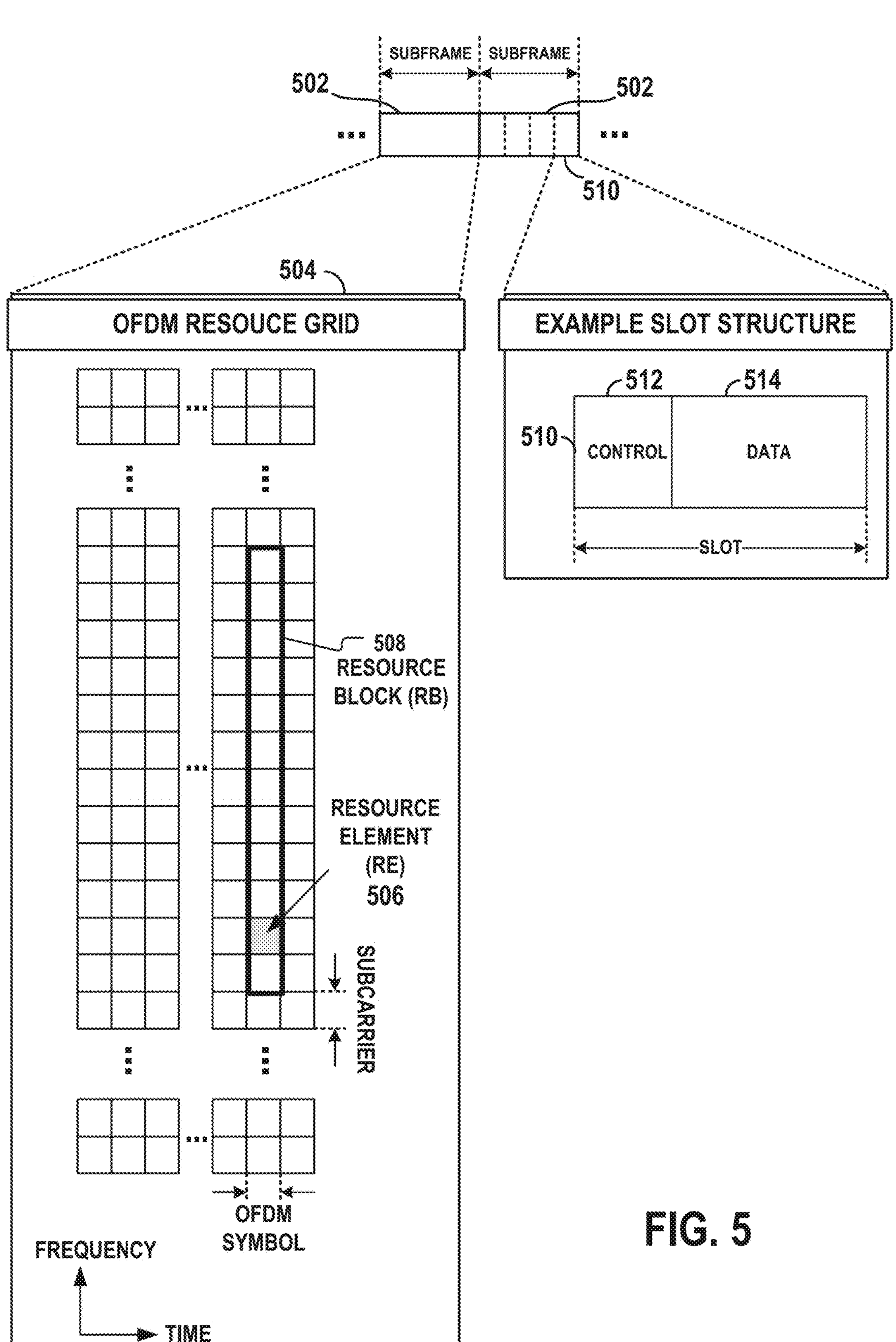
FIG. 5 is a schematical illustration of an organization of wireless resources in an air interface utilizing OFDM according to some aspects of this disclosure.

FIG. 5 is a schematical illustration of an organization of wireless resources in an air interface utilizing OFDM according to some aspects of this disclosure. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may include a set of subframes (e.g., 10 subframes of 1 ms each). A given carrier may include one set of frames in the UL, and another set of frames in the DL. FIG. 4 illustrates an expanded view of an exemplary DL subframe 502, showing an OFDM resource grid 504. However, as those skilled in the art will readily appreciate, the PHY transmission structure for any application may vary from the example described here, depending on any number of factors. Here, time is in the horizontal direction with units of OFDM symbols; and frequency is in the vertical direction with units of subcarriers or tones.

The resource grid 504 may schematically represent time-frequency resources for a given antenna port. That is, in a MIMO implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may span 12 subcarriers, a number independent of the numerology used. In some examples, depending on the numerology, an RB may include any suitable number of consecutive OFDM symbols in the time domain.

A given UE generally utilizes only a subset of the resource grid 504. An RB may be the smallest unit of resources that a scheduler can allocate to a UE. Thus, the more RBs scheduled for a UE, and the higher the modulation scheme chosen for the air interface, the higher the data rate for the UE.

In this illustration, RB 508 occupies less than the entire bandwidth of the subframe 502, with some subcarriers illustrated above and below the RB 508. In a given implementation, subframe 502 may have a bandwidth corresponding to any number of one or more RBs 508. Further, the RB 508 is shown occupying less than the entire duration of the subframe 502, although this is merely one possible example.

Each 1 ms subframe 502 may include one or multiple adjacent slots. In FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A network node may in some cases transmit these mini-slots occupying resources scheduled for ongoing slot transmissions for the same or for different UEs.

An expanded view of one of the slots 510 illustrates the slot 510 including a control region 512 and a data region 514. In general, the control region 512 may carry control channels (e.g., PDCCH), and the data region 514 may carry data channels (e.g., PDSCH or PUSCH). Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within an RB 508 may carry one or more physical channels, including control channels, shared channels, data channels, etc. Other REs 506 within the RB 508 may also carry pilots or reference signals, such as CSI-RSs which may be sent by a plurality of TRPs. These pilots or reference signals may provide for a receiving device to perform channel estimation of the corresponding channel, which may enable coherent demodulation/detection of the control and/or data channels within the RB 508.

In a DL transmission, the transmitting device (e.g., a network node 108) may allocate one or more REs 506 (e.g., within a control region 512) to carry one or more DL control channels. These DL control channels include DL control information 114 (DCI) that generally carries information originating from higher layers, such as a physical broadcast channel (PBCH), a physical downlink control channel (PDCCH), etc., to one or more UEs 106. In addition, the network node may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A network node may transmit the synchronization signals PSS and SSS (collectively referred to as SS), and in some examples, the PBCH, in an SS block that includes 4 consecutive OFDM symbols. In the frequency domain, the SS block may extend over 240 contiguous subcarriers. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry DCI for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 506 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the network node 108 to schedule uplink transmissions. Here, in response to the SR transmitted on the UL control channel 118 (e.g., a PUCCH), the network node 108 may transmit DCI 114 that may schedule resources for uplink packet transmissions.

UCI may also include hybrid automatic repeat request (HARQ) feedback such as an ACK, NACK, CSI, or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 506 (e.g., within the data region 514) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 5 are not necessarily all the channels or carriers that may be utilized between a network node 108 and UE 106, and those of ordinary skill in the art will recognize that other channels or carriers may be utilized in addition to those illustrated, such as other traffic, control, and feedback channels.

Figure 6:
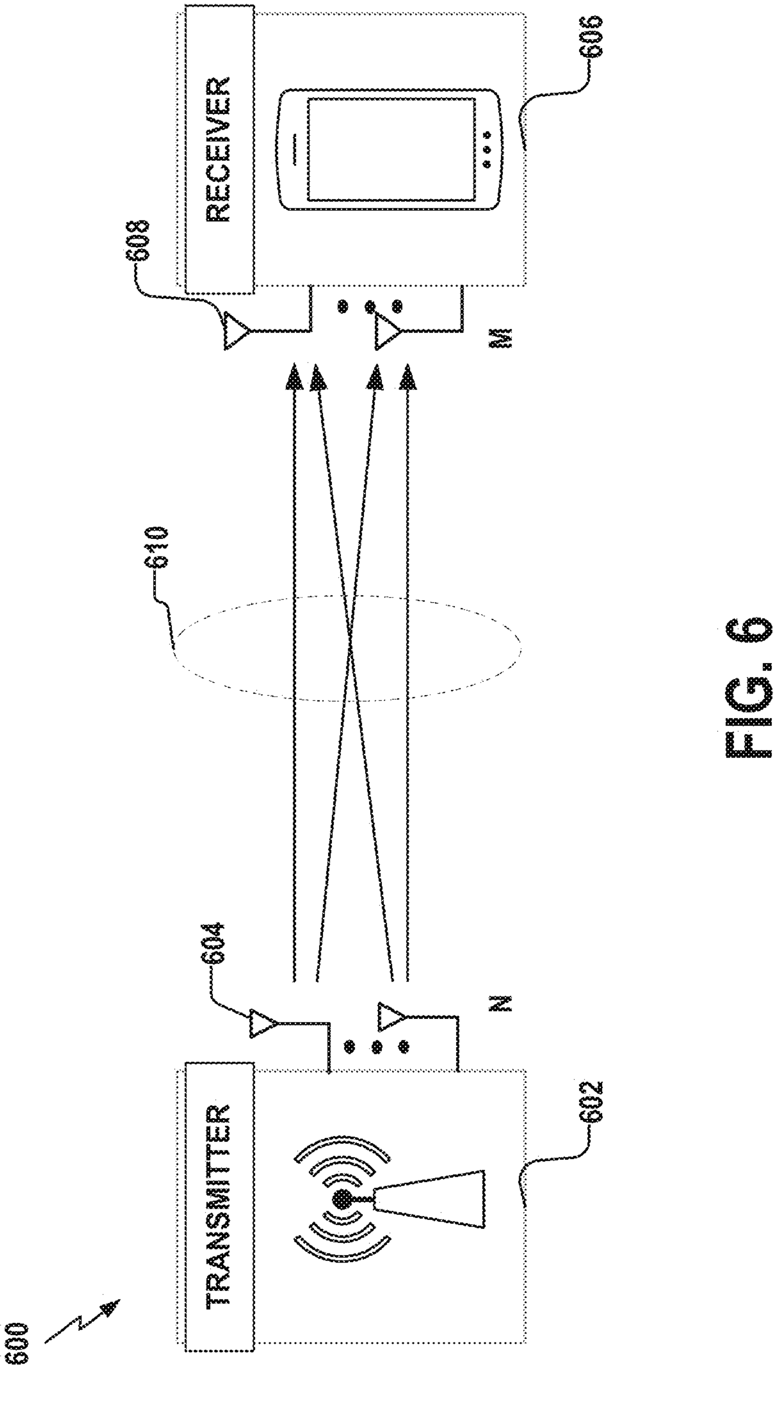
FIG. 6 illustrates an example of a wireless communication system with multiple antennas, supporting beamforming and/or multiple-input multiple-output (MIMO) according to some aspects of this disclosure.

In some aspects of the disclosure, a network node and/or UE may be configured with multiple antennas for beamforming and/or multiple-input multiple-output (MIMO) technology. FIG. 6 illustrates an example of a wireless communication system with multiple antennas, supporting beamforming and/or MIMO according to some aspects of this disclosure. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system 600, a transmitter 602 includes multiple transmit antennas 604 (e.g., N transmit antennas) and a receiver 606 includes multiple receive antennas 608 (e.g., M receive antennas). Thus, there are N×M signal paths 610 from the transmit antennas 604 to the receive antennas 608. Each of the transmitter 602 and the receiver 606 may be implemented, for example, within a network node 108, a UE 106, or any other suitable wireless communication device.

In a MIMO system, spatial multiplexing may be used to transmit multiple different streams of data, also referred to as layers, simultaneously on the same time-frequency resource. In some examples, a transmitter 602 may send multiple data streams to a single receiver. In this way, a MIMO system takes advantage of capacity gains and/or increased data rates associated with using multiple antennas in rich scattering environments where channel variations can be tracked. Here, the receiver 606 may track these channel variations and provide corresponding feedback to the transmitter 602. In one example case, as shown in FIG. 6, a rank-2 (i.e., including 2 data streams) spatial multiplexing transmission on a 2×2 MIMO antenna configuration will transmit two data streams via two transmit antennas 604. The signal from each transmit antenna 604 reaches each receive antenna 608 along a different signal path 610. The receiver 606 may then reconstruct the data streams using the received signals from each receive antenna 608.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency and reducing the required transmission energy. This is achieved by a transmitter 602 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 606) may transmit feedback including a quantized version of the channel so that the transmitter 602 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 604 or 608, whichever is lower. In addition, the channel conditions at the receiver 606, as well as other considerations, such as the available resources at the transmitter 602, may also affect the transmission rank. For example, a network node in a RAN (e.g., transmitter 602) may assign a rank (and therefore, a number of data streams) for a DL transmission to a particular UE (e.g., receiver 606) based on a rank indicator (RI) the UE transmits to the network node. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The network node may use the RI along with resource information (e.g., the available resources and amount of data to be scheduled for the UE) to assign a DL transmission rank to the UE.

The transmitter 602 determines the precoding of the transmitted data stream or streams based, e.g., on known channel state information of the channel on which the transmitter 602 transmits the data stream(s). For example, the transmitter 602 may transmit one or more suitable reference signals (e.g., a channel state information reference signal, or CSI-RS) that the receiver 606 may measure. In some examples, the transmitter 602 may transmit the CSI-RS via each of a plurality of TRPs. The receiver 606 may then report measured channel quality information (CQI) back to the transmitter 602. This CQI generally reports the current communication channel quality, and in some examples, a requested transport block size (TBS) for future transmissions to the receiver. In some examples, the receiver 606 may further report a PMI to the transmitter 602. This PMI generally reports the receiver's 606 preferred precoding matrix for the transmitter 602 to use, and may be indexed to a predefined codebook. In some examples, the PMI may be based on N, the number of cooperating TRPs. The transmitter 602 may then utilize this CQI/PMI to determine a suitable precoding matrix for transmissions to the receiver 606.

In Time Division Duplex (TDD) systems, the UL and DL may be reciprocal, in that each uses different time slots of the same frequency bandwidth. Therefore, in TDD systems, a transmitter 602 may assign a rank for DL MIMO transmissions based on an UL SINR measurement (e.g., based on a sounding reference signal (SRS) or other pilot signal transmitted from the receiver 606). Based on the assigned rank, the transmitter 602 may then transmit a CSI-RS with separate sequences for each layer to provide for multi-layer channel estimation. From the CSI-RS, the receiver 606 may measure the channel quality across layers and resource blocks. The receiver 606 may then transmit a CSI report (including, e.g., CQI, RI, and PMI) to the transmitter 602 for use in updating the rank and assigning resources for future DL transmissions. In some examples, the receiver 606 may receive CSI-RSs from a plurality of TRPs and measure the channel quality for each TRP. The receiver 606 may determine a recommended set of TRPs for CJT communication with transmitter 602, for example, based on the channel quality for each TRP.

Figure 7:
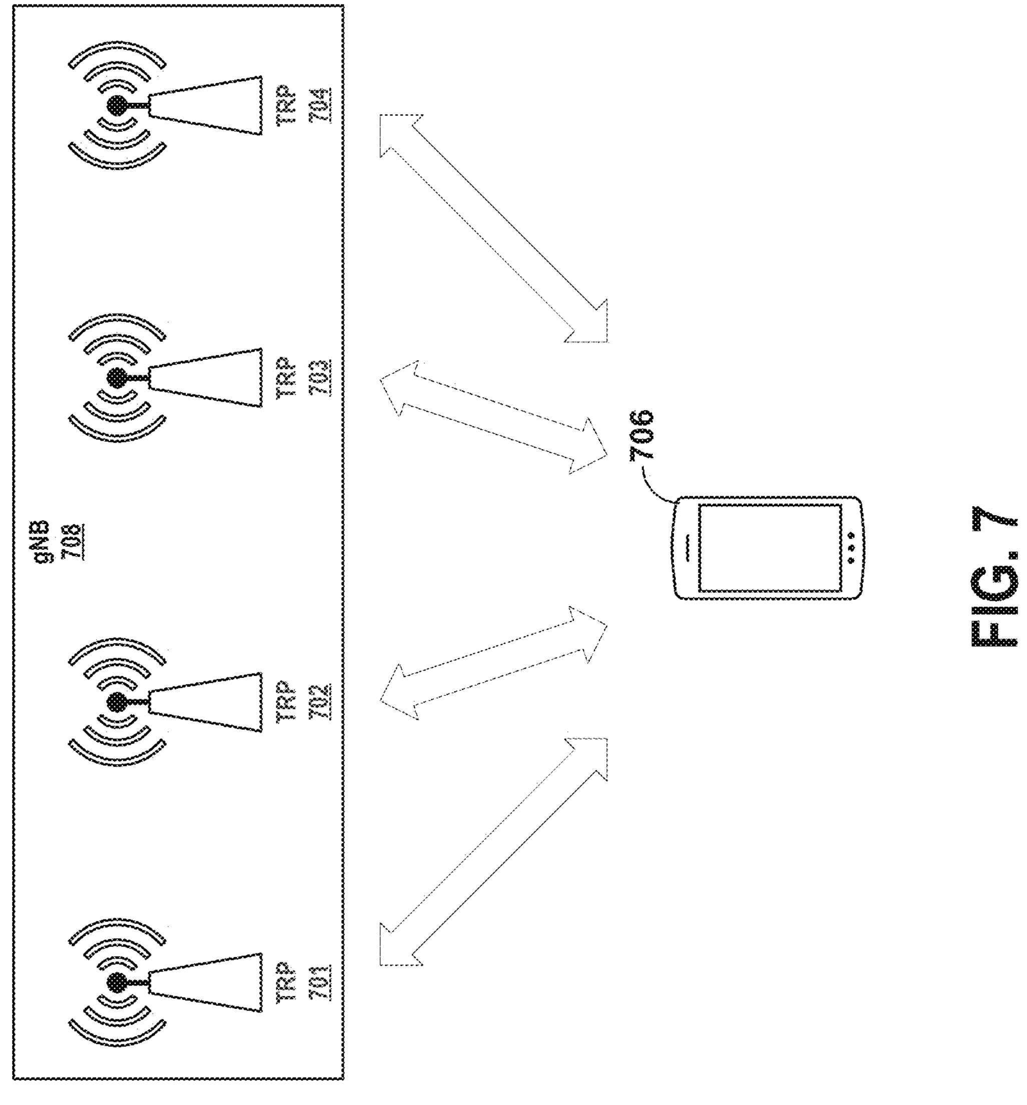
FIG. 7 is a conceptual diagram illustrating mTRP CJT communications between multiple TRPs and a UE according to some aspects of this disclosure.

FIG. 7 is a conceptual diagram illustrating mTRP CJT communications between multiple TRPs and a UE according to some aspects of this disclosure. A UE 706, which may be an example of the UE 106 or other UE set forth herein, may be configured to communicate with a gNB 708, which may be an example of the scheduling entity 108 or one or more elements of disaggregated base station 300, through a plurality of TRPs (e.g., mTRPs). Similarly, the gNB 708 may be configured to communicate with the UE 706 through mTRPs. In the example of FIG. 7, the gNB 708 includes four TRPs: namely, TRP 701; TRP 702; TRP 703; and TRP 704. While four TRPs are shown in the gNB 708, in some examples, there may be fewer than four TRPs or more than four TRPs.

In some examples, the gNB 708 and the UE 706 may communicate using mTRP CJT communications. During mTRP CJT communication, a particular combination of two or more of the TRPs 701-704 may be used. Currently, 3GPP 5G specifications set forth a maximum number of TRPs ($N_{TRP}$) that may be used in CJT of four ($N_{TRP}$=4). However, it may be desirable to use another number of TRPs rather than all four in the example of FIG. 708. As such, selection of how many TRPs should be used (N) and which TRPs of the TRPs 701-704 should be included in the set of TRPs to be used for CJT between the gNB 708 and the UE 706 is of importance. Therefore, example signaling frameworks are set forth herein to communicate the number of TRPs (the value of N) and/or the set of TRPs to be used for CJT between the gNB 708 and the UE 706.

The UE 706 may receive reference signals from each of the TRPs 701-704, e.g., CSI-RSs. Based on these reference signals, the UE 706 may determine channel characteristics or other information that may be useful in determining a recommendation of how many and/or which of the TRPs 701-704, should be used for CJT between the gNB 708 and the UE 706. The UE 706 may determine such a recommendation. In some examples, the UE 706 may send a recommended value for N and/or identify the recommended set of associated TRPs making up the N TRPs to be used for CJT to the gNB 708. For example, the UE 706 may use non-zero power (NZP) CSI-RS resource IDs as a proxy to identify a recommended set of TRPs to be used for CJT, as there is not a currently established TRP identifier which may be used for such purposes. In some examples, the UE 706 may send the NZP CSI-RS resource IDs as a proxy for the channel management resource (CMR) for particular TRPs, without the actual CSI report, in a group-based beam report to the gNB 708. With group-based beam reporting, the UE 706 may report multiple Reference Signal Received Power (RSRP) or Signal to Interference+Noise Ratio (SINR) values associated with a CSI-RS Resource ID. So in a single report the UE can report multiple RSRPs or SINRs, for example, those associated with recommended TRPs to be used for mTRP CJT communication.

For example, the UE 706 may use legacy or enhanced group-based beam reporting to identify the recommended TRPs for mTRP CJT communication. In some examples, a CSI-RS resource and/or report setting may be dedicatedly configured for CJT TRP selection and/or reporting with group-based beam reporting enabled. In some examples, an information element, such as an additional bit field (e.g., which may contain one or more bits) or an additional flag, may be added to, or included in, a group-based beam report to signal that the report implicitly indicates the UE 706 recommended or preferred mTRP resources to be used for mTRP CJT, such that the CJT CSI may be leveraged. In some examples, L1-RSRP or L1-SINR may be reported together with CRIs. In some examples, the UE 706 may determine a number of CPU units that may be associated with processing CSI for the group-based beam reporting and may report to the gNB 708 CSI processing criteria, such as for a RSRP or SINR report, for example, $O_{CPU}$=1.

In some examples, the UE 706 may send a group-based beam report without RSRP/SINR values, or with values corresponding to a preconfigured value (e.g., 0 or some other value) may be used to automatically convey a CJT recommendation without an additional bit field being added to the group-based beam report. In this example, as the predetermined RSRP and/or SINR value(s) correspond to the CJT recommendation, the UE 706 may determine the number of CPU processing units associated with processing CSI processing criteria may be 0. For example, reportQuantity may be set to 'none' (e.g., $O_{CPU}$=0).

In some examples, the group-based beam reporting may be expanded to support up to $N_{TRP}$ (the maximum number of TRPs that can be used for mTRP CJT) group reporting. This reporting is currently limited to 2 CRIs.

In some examples, a rule may be implemented that a last reported (legacy) group-based beam report (e.g., the most recently received group-based beam report by gNB 708) automatically conveys the UE 706 recommendation for CJT. In some examples, the 'last' group-based beam report may be defined based on some pre-configured timeline or threshold requirement.

Alternatively, or additionally, the UE 706 may utilize a different report, such as a specific TRP recommendation report, which may be created to facilitate the recommendation of N and/or associated recommended TRPs from the UE 706 to the gNB 708. In some examples, the UE 706 may use such a report to recommend to the gNB 708, a recommended value for N and an associated set of recommended TRPs, without using a CSI report to communicate such recommendations. For example, a TRP recommendation report may be defined in a standards specification, setting forth a technique for a UE to inform a gNB of a recommendation for N and/or for associated recommended TRPs to be used for mTRP CJT communication. In some examples, such a report may explicitly include a recommendation of the value of N and which TRPs are preferred to be used for mTRP CJT communication (e.g., which TRPs are the N preferred TRPs).

For example, such a report may define and/or map up to $2^{N_{TRP}}$-1 codepoints ($N_{TRP}$ bits) to possible TRP combinations. For example, $\{TRP_1\}$, $\{TRP_1, TRP_2\}$, $\{TRP_1, TRP_3\}$. $\{TRP_1, TRP_2, \ldots, TRP_{N_{TRP}}\}$. In some examples, all 0 codepoints, where each codepoint is equal to 0, may be used to indicate the UE 706 does not have any recommendation. The UE 706 may send such a report through UCI or a media access control control element (MAC CE), for example.

For example, if $N_{TRP}$=3 (e.g., either as determined by the gNB 708 or recommended by the UE 706), then the UE 706 may use a 3-bit recommendation to recommend which TRPs should make up the 3 TRPs to be used for mTRP CJT communication. In such a case, the following example mapping (in the form of a bitmap) may be utilized by the UE 706 to communicate the recommendation to the gNB 708.

| Bits | Recommendation |
|---|---|
| 000 | No recommendation |
| 001 | $TRP_1$ |
| 010 | $TRP_2$ |
| 100 | $TRP_3$ |
| 011 | $\{TRP_1, TRP_2\}$ |
| 101 | $\{TRP_1, TRP_3\}$ |
| 110 | $\{TRP_2, TRP_3\}$ |
| 111 | $\{TRP_1, TRP_2, TRP_3\}$. |

For example, the order of $TRP_1$, $TRP_2$, and $TRP_3$, may be determined by any technique for identifying different TRPs (e.g., CRIs) which may be used by the gNB 708 or the UE 706. By using such a bitmap to provide the recommendations, instead of sending specific TRP identifiers, communication bandwidth and processing power may be saved.

In some examples, the gNB 708 may receive the recommendation from the UE 706 and may determine a response. For example, the gNB 708 may determine whether to follow the received recommendation or not to follow the received recommendation. For example, the gNB 708 may request that the UE 706 provide an Aperiodic (AP) CSI report for the recommended N TRPs or may request the UE 706 to report CSI (e.g., RI, PMI, CQI, etc.) for set of TRPs determined by the gNB 708 (an override set of TRPs).

For example, if the gNB 708 determines to follow the received recommendation, the gNB 708 may send an ACK to the UE 706 acknowledging that the recommendation will be followed or implemented. If the gNB 708 determines not to follow the received recommendation, for example, if the gNB 708 determines that particular combination of N TRPs is not usable, e.g., due to network resources and/or network requirements, the gNB 708 may request, e.g., via an AP CSI report triggering DCI, a value of N and/or which N TRPs about which the gNB 708 would like additional information. For example, the AP CSI report may include information about the value of N and for which N TRPs CJT CSI is to be reported by the UE 706 to the gNB 708.

In some examples, based on a rule (which may or may not be specified in a standard specification), the UE 706 may send a CJT CSI report based on the N TRP recommendation the UE 706 sent to the gNB 708. In some examples, this rule may be implicit. For example, the UE 706 may autonomously report the CSI after a predetermined number of slots after sending the recommendation report. Alternatively, or additionally, the UE 706 may start a timer after sending the recommendation report. In such a case, if the UE 706 does not receive an ACK (or other response) from the gNB 708 before the timer expires, the UE 706 may transmit a CJT involving N TRPs precoder report and may optionally, also retransmit the recommendation. In some examples, the timer value may be set to 0. In this case, the UE 706 may send the set of recommended TRPs together with (or as part of) the CSI for the transmission hypothesis of the recommended TRPs.

Figure 8:
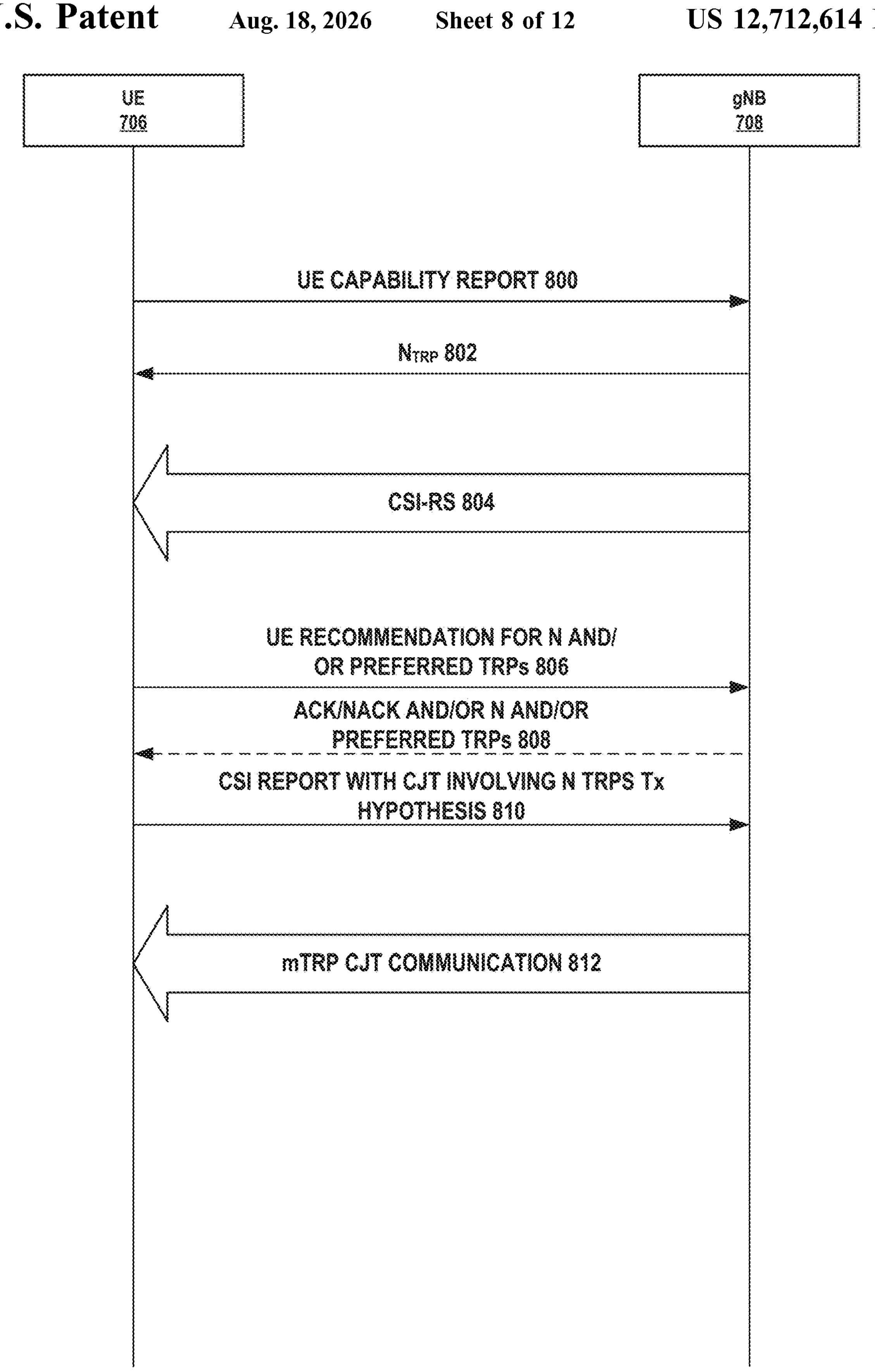
FIG. 8 is a flow diagram illustrating example mTRP CJT CSI feedback techniques between a UE and gNB according to some aspects of this disclosure.

FIG. 8 is a flow diagram illustrating example mTRP CJT CSI feedback techniques between a UE and gNB according to some aspects of this disclosure. While discussed with respect to UE 706 and gNB 708, it should be understood that the techniques of FIG. 8 may be practiced by a UE interacting with one or more elements of a disaggregated base station, such as disaggregated base station 300. It should be noted that the order and/or the content of the example techniques of FIG. 8 may vary. Fewer or more steps may be utilized and still fall within the scope of this disclosure.

The UE 706 may send, to the gNB 708, a UE capability report 800. The UE capability report 800 may include information relating to the capabilities of the UE 706, such as radio frequency and/or physical layer information and/or feature group information. The gNB 708 may send to the UE 706 a value of $N_{TRP}$ 802. For example, the gNB 708 may determine a value of $N_{TRP}$ based on information in the UE capability report 800, other network or gNB 708-related information, or a combination thereof. In some examples, the value of $N_{TRP}$ 802 may be 4. In other examples, the value of $N_{TRP}$ 802 may be a value other than 4 (e.g., a value less than or greater than 4).

The TRPs 701-704 of the gNB 708 may each send a CSI reference signal (CSI-RS) 804 to the UE 706. The UE 706 may receive the CSI-RSs from the TRPs 701-704 and may use the received CSI-RSs to determine a recommendation for a value of N and/or for which TRPs should be among the N TRPs used for mTRP CJT communication between the gNB 708 and the UE 706. For example, UE 706 may analyze signal characteristics (e.g., bandwidth, received signal strength, signal-to-noise ratio, latency, error rate, etc.) of the CSI-RSs from each of the TRPs 701-704 and determine how many TRPs and/or which combination of TPRs 701-704 are likely provide a preferred mTRP CJT communication quality or experience for UE 706 as the recommendation for the value of N and/or for which TRPs should be among the N TRPs used for mTRP CJT communication between the gNB 708 and the UE 706. For example, the recommendation may be that N should be 3 and that the TRPs used for mTRP CJT should be TRP 701, TRP 702, and TRP 704.

The UE 706 may send the recommendation for N and/or preferred TRPs 806 to the gNB 708. As discussed above such a recommendation may be in a group-based beam report, may be in a TRP recommendation report, or the like, and may be conveyed in a manner such as discussed above with respect to FIG. 7. For example, the recommendation may be part of a beam selection report with group-based beam reporting enabled. For example, the beam selection report may include the optimal beam(s) between the UE 706 and the gNB 708. For example, the beam selection report may include a group of beams between various TRPs of the TRPs 701-704 and the UE 706. In some examples, the beam selection report may include a set of CSI-RS Resource IDs (CRIs) corresponding to CSI-RS transmissions from TRPs in the recommended set of TRPs (e.g., from TRP 701, TRP 702, and TRP 704). In this manner, the beam selection report may identify specific TRPs of the TRPs 701-704. In some examples, the beam selection report may include an information element (e.g., a flag) configured to indicate that the beam selection report provides the recommended set of TRPs for use in mTRP CJT.

In the case where the UE 706 sends a recommendation for N, but not the preferred TRPs (e.g., the recommendation is that N should be 3), the gNB 708 may utilize predetermined TRPs (e.g., the first 3 TRPs, such as TRP 701, TRP 702, and TRP 703) to determine which TRPS should be the N TRPs for mTRP CJT communication between the UE 706 and the gNB 708. Alternatively, the gNB 708 may send an indication to the UE 706 for the UE 706 to send a recommendation of which TRPs of TRPs 701-704 should be used for mTRP CJT communication between the UE 706 and the gNB 708. In some examples, this indication may be in the form of an ACK or a NACK, which the UE 706 may interpret as a request for a recommendation for an identification of which TRPs of TRPs 701-704 should be used for mTRP CJT communication between the UE 706 and the gNB 708.

The gNB 708 may determine whether or not to follow the recommendations in recommendation for N and/or preferred TRPs 806. Optionally, the gNB 708 may send to the UE 706 an ACK (e.g., of ACK/NACK and/or N and/or preferred TRPs 808) indicating that the gNB 708 has determined to follow the UE 706's recommendation(s), a NACK (e.g., of ACK/NACK and/or N and/or preferred TRPs 808) indicating that the gNB 708 has determined not to follow the UE 706's recommendation(s), a value of N (e.g., of ACK/NACK and/or N and/or preferred TRPs 808) indicative of the number of TRPs the gNB 708 is going to use for mTRP CJT communication with the UE 706, or an indication of which TRPs (an override set of TRPs) (e.g., of ACK/NACK and/or N and/or preferred TRPs 808) the gNB 708 may use for mTRP CJT communication with the UE 706 (ACK/NACK and/or N and/or preferred TRPs 808).

In the example, where the gNB 708 sends a NACK indicating that the gNB 708 has determined not to follow the UE 706's recommendation(s), the UE 706 may send to the gNB 708 a different recommendation for a value of N and/or for which TRPs should be among the N TRPs used for mTRP CJT communication between the gNB 708 and the UE 706, which gNB 708 may determine whether or not to follow. In this manner, in some examples, the UE 706 and the gNB 708 may exchange more than one recommendation for N and/or preferred TRPs 806 and/or ACK/NACK and/or N and/or preferred TRPs 808. Alternatively, gNB 708 may use predetermined TRPs, a predetermined subset of the recommended TRPS, for mTRP CJT communication with the UE 706 or not use mTRP CJT communication with UE 706.

In the example, where the gNB 708 sends a value of N indicative of the number of TRPs the gNB 708 is going to use for mTRP CJT communication with the UE 706, the UE 706 may send to the gNB 708 a recommendation of which TRPs should make up the N TRPs used for mTRP CJT communication between the gNB 708 and the UE 706. In this manner, in some examples, the UE 706 and the gNB 708 may exchange more than one recommendation for N and/or preferred TRPs 806 and/or ACK/NACK and/or N and/or preferred TRPs 808. Alternatively, gNB 708 may use predetermined TRPs to make up the N TRPs for mTRP CJT communication with the UE 706.

The UE 706 may generate a CSI report with CJT involving N TRPs Tx hypothesis 810. For example, the UE 706 may utilize the CSI-RS 804*s* received from the TRPs involved in the Tx hypothesis to generate the CSI report with CJT involving N TRPs Tx hypothesis 810. The CSI report with CJT involving N TRPs Tx hypothesis 810 may be based on UE recommendation for N and/or preferred TRPs 806 and/or ACK/NACK and/or N and/or preferred TRPs 808. For example, in the case that the gNB 708 sends an ACK to the UE 706, the Tx hypothesis may include information relating to the mTRP CJT communication or aspects thereof if the mTRP CJT communication were to utilize the UE recommendation (e.g., if the mTRP CJT communication between the UE 706 and the gNB 708 were to use TRP 701, TRP 702, and TRP 704). In such a case, the CSI report with CJT involving N TRPs Tx hypothesis 810 may be based on the CSI-RS 804*s* from TRP 701, TRP 702, and TRP 704.

In the case that the gNB 708 sends a NACK to the UE 706 and predetermined TRPs are going to be used for mTRP CJT as discussed above, the Tx hypothesis may include information relating to the mTRP CJT communication or aspects thereof if the mTRP CJT communication were to utilize the predetermined TRPs. For example, the UE 706 may generate the CSI report with CJT involving N TRPs Tx hypothesis 810 for the N and the specific TRPs of TRPs 701-704 which are to make up the N TRPs to be used for mTRP CJT communication between the gNB 708 and the UE 706. In such a case, the CSI report with CJT involving N TRPs Tx hypothesis 810 may be based on the CSI-RS 804*s* from the predetermined TRPs.

The gNB 708 may utilize the information within the CSI report with CJT involving N TRPs Tx hypothesis 810 to set up the mTRP CJT communication with UE 706. For example, gNB 708 may utilize information with the CSI report with CJT involving N TRPs Tx hypothesis 810 to determine a precoding matrix to use for mTRP CJT communication with UE 706. The gNB 708 may initiate mTRP CJT communication 812 with the UE 706 using the TRPs associated with the CSI report with CJT involving N TRPs Tx hypothesis 810.

It should be noted that the techniques of this disclosure may be particularly applicable to values of $N_{TRP}$ which are greater than or equal to 3. Switching between sTRP and CJT may be possible (e.g., semi-statically, dynamically, etc.) based on UE capability for values of $N_{TRP}$ which are equal to 2, which may also utilize techniques of this disclosure.

Figure 9:
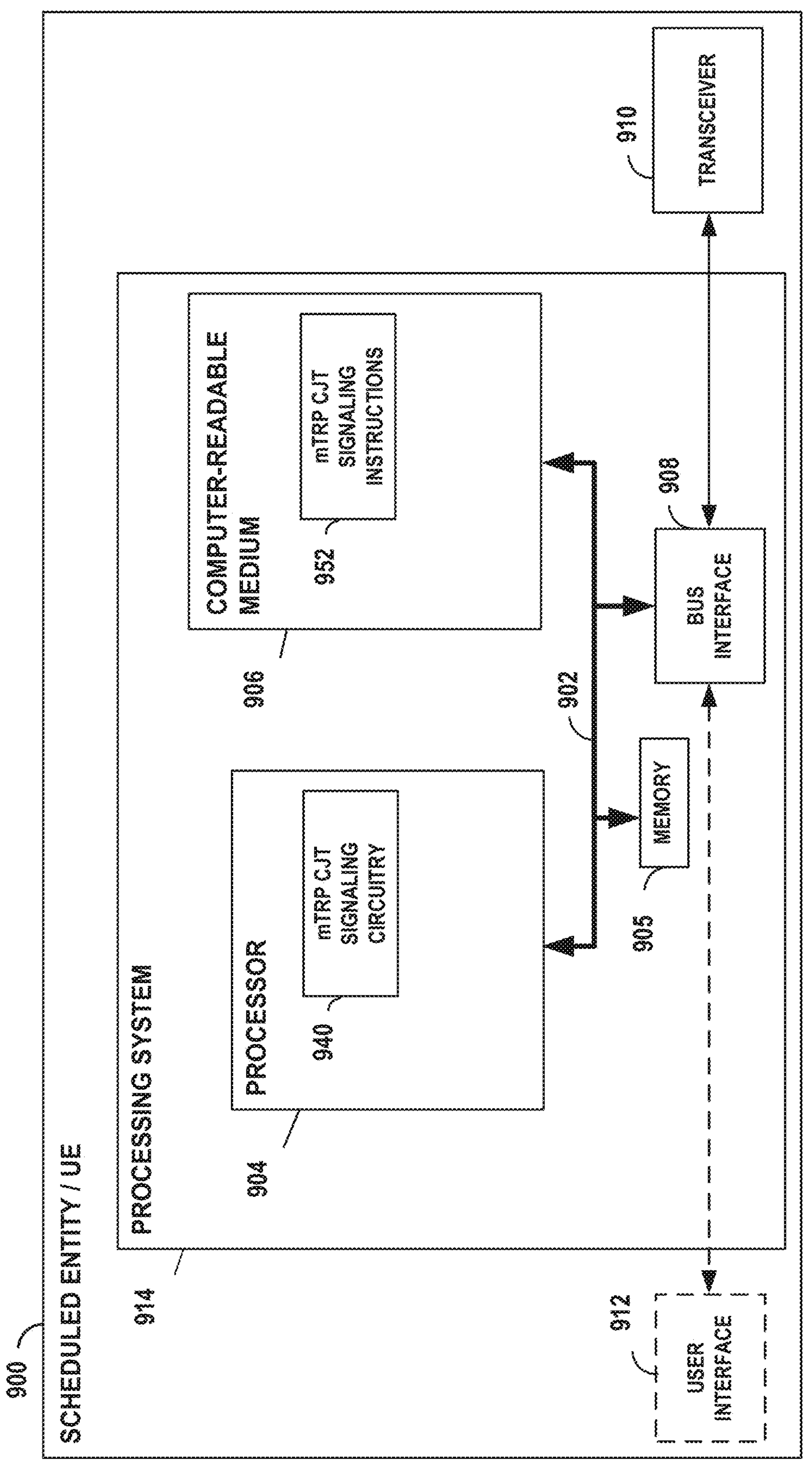
FIG. 9 is a block diagram illustrating an example of a hardware implementation for a scheduled entity according to some aspects of this disclosure.

FIG. 9 is a block diagram illustrating an example of a hardware implementation for a scheduled entity according to some aspects of this disclosure. For example, the scheduled entity 900 may be a user equipment (UE) as illustrated in any one or more of FIGS. 1-3 and/or 6-8.

The scheduled entity 900 may include a processing system 914 having one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 900 may be configured to perform any one or more of the functions described herein. For example, the processor 904, as utilized in a scheduled entity 900, may be configured (e.g., in coordination with the memory 905) to implement any one or more of the processes and procedures described below and illustrated in FIG. 11.

The processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and some examples, such as a base station, may omit it.

In some aspects of the disclosure, the processor 904 may include the transceiver 910 and the memory 905. The processor 904 include mTRP CJT signaling circuitry 940 which may be configured (e.g., in coordination with the memory 905) for various functions, including, receiving a respective reference signal from each of a plurality of TRPs; transmitting a first message comprising a recommended set of TRPs from among the plurality of TRPs for use in CJT based on the respective reference signals; and transmitting a second message comprising a CSI report based on a transmission hypothesis, wherein the transmission hypothesis is based on the recommended set of TRPs or an override set of TRPs from among the plurality of TRPs for use in CJT. For example, the processor 904 may be configured to implement one or more of the functions described below in relation to FIG. 11, including, e.g., blocks 1100, 1102, and/or 1104.

The processor 904 is responsible for managing the bus 902 and general processing, including the execution of software stored on the computer-readable medium 906. The software, when executed by the processor 904, causes the processing system 914 to perform the various functions described below for any particular apparatus. The processor 904 may also use the computer-readable medium 906 and the memory 905 for storing data that the processor 904 manipulates when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may store computer-executable code that includes mTRP CJT signaling instructions 952 that configure a scheduled entity 900 for various functions, including. e.g., receiving a respective reference signal from each of a plurality of TRPs; transmitting a first message comprising a recommended set of TRPs from among the plurality of TRPs for use in CJT based on the respective reference signals; and transmitting a second message comprising a CSI report based on a transmission hypothesis, wherein the transmission hypothesis is based on the recommended set of TRPs or an override set of TRPs from among the plurality of TRPs for use in CJT. For example, the mTRP CJT signaling instructions 952 may be configured to cause a scheduled entity 900 to implement one or more of the functions described below in relation to FIG. 11, including, e.g., blocks 1100, 1102, and/or 1104. The mTRP CJT signaling instructions 952 may further be configured to cause a scheduled entity 900 to implement one or more of the functions described below in relation to FIG. 12, including, e.g., blocks 1200, 1202, and/or 1204.

In one configuration, an apparatus (e.g., scheduled entity 900) for wireless communication includes means for receiving a respective reference signal from each of a plurality of TRPs; means for transmitting a first message comprising a recommended set of TRPs from among the plurality of TRPs for use in CJT based on the respective reference signals; and means for transmitting a second message comprising a CSI report based on a transmission hypothesis, wherein the transmission hypothesis is based on the recommended set of TRPs or an override set of TRPs from among the plurality of TRPs for use in CJT. In one aspect, the aforementioned means may be the processor(s) 904 configured to perform the functions recited by the aforementioned means. In another aspect, the aforementioned means may be a circuit or any apparatus configured to perform the functions recited by the aforementioned means.

Figure 11:
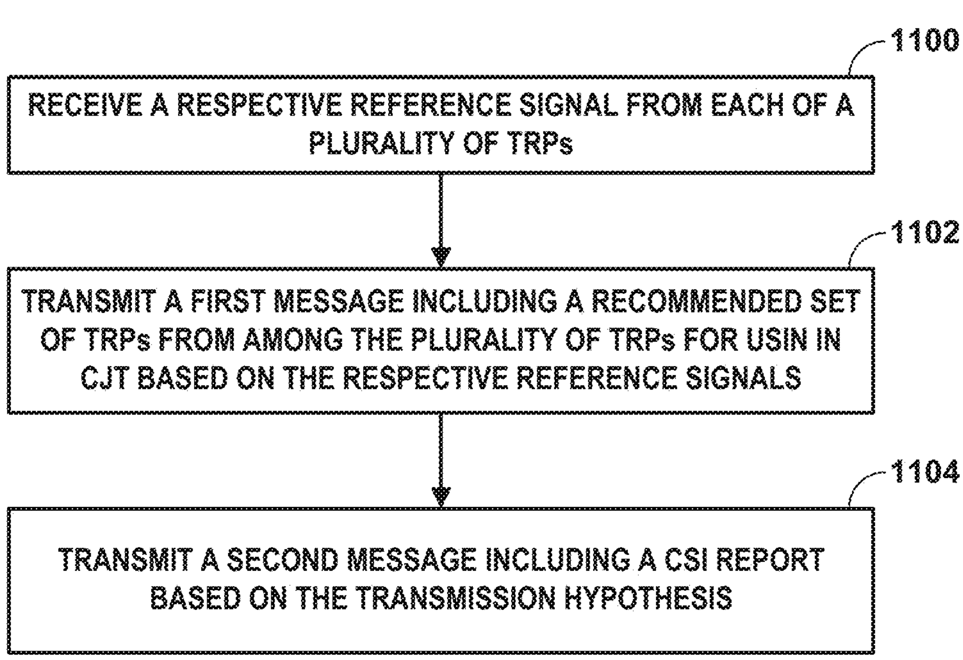
FIG. 11 is a flow diagram illustrating exemplary techniques for mTRP CJT signaling in accordance with some aspects of the present disclosure.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described with respect to any of the FIGs. of this disclosure, and utilizing, for example, the processes and/or algorithms described herein in relation to FIGS. 11 and/or 12.

Figure 10:
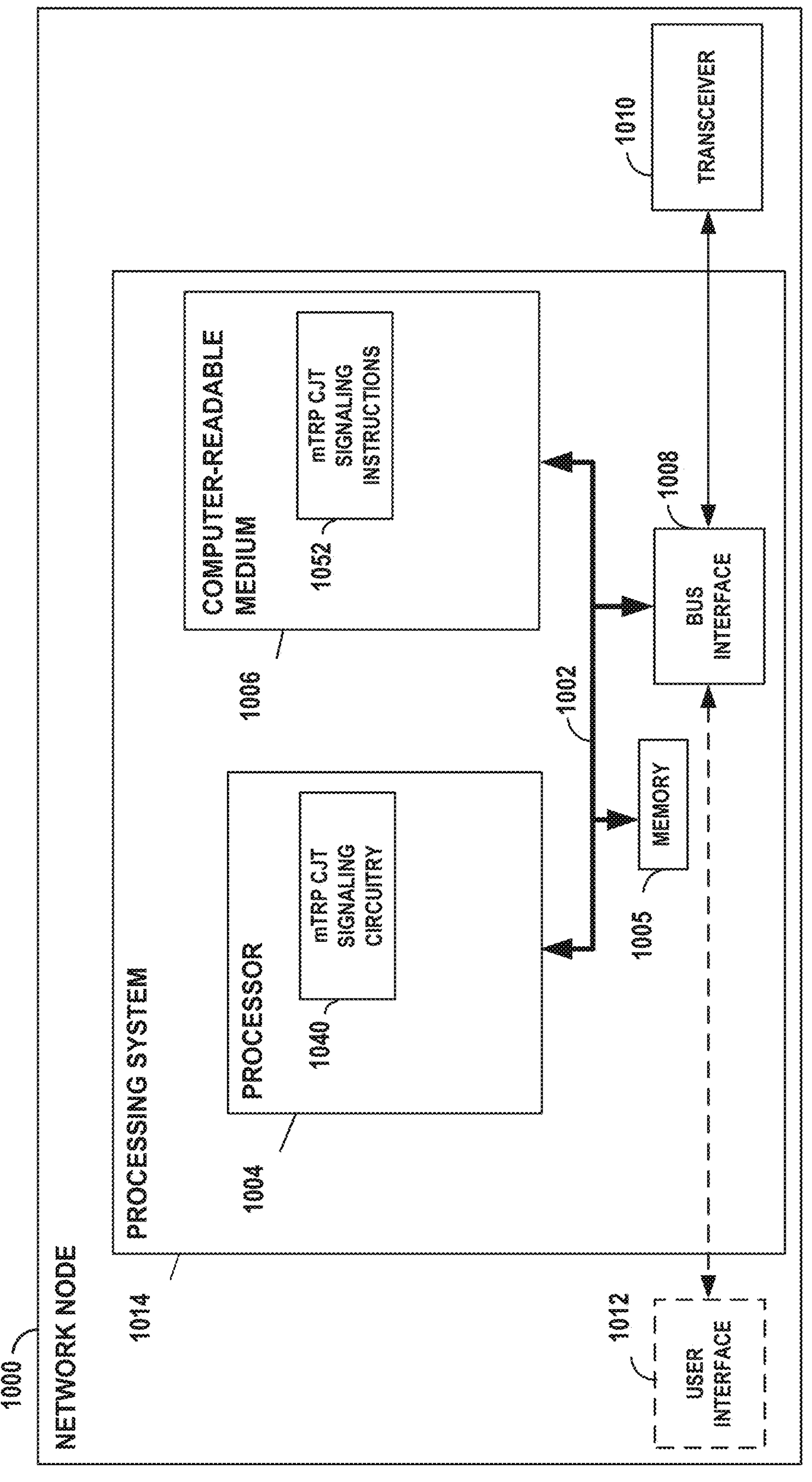
FIG. 10 is a block diagram illustrating an example of a hardware implementation for a network node according to some aspects of this disclosure.

FIG. 10 is a block diagram illustrating an example of a hardware implementation for a network node according to some aspects of this disclosure. In accordance with various aspects of the disclosure, a processing system 1014 may include an element, or any portion of an element, or any combination of elements having one or more processors 1004. For example, the network node 1000 may be a base station (and/or gNB) as illustrated in any one or more of FIGS. 1-3 and/or 6-8.

The processing system 1014 may be substantially the same as the processing system 1014 illustrated in FIG. 9, including a bus interface 1008, a bus 1002, memory 1005, a processor 1004, and a computer-readable medium 1006. Furthermore, the network node 1000 may include a user interface 1012 and a transceiver 1010 substantially similar to those described above in FIG. 7. That is, the processor 1004, as utilized in a network node 1000, may be configured (e.g., in coordination with the memory 1005) to implement any one or more of the processes described below and illustrated in FIG. 11.

In some aspects of the disclosure, the processor 1004 may include mTRP CJT signaling circuitry 1040 configured (e.g., in coordination with the memory 1005) for various functions, including, for example, transmitting a respective reference signal from each of a plurality of TRPs; receiving a first message comprising a recommended set of TRPs from among the plurality of TRPs for use in CJT based on the respective reference signals; and receiving a second message comprising a CSI report based on a transmission hypothesis corresponding to the recommended set of TRPs or an override set of TRPs from among the plurality of TRPs for use in CJT. For example, the mTRP CJT signaling circuitry 1040 may be configured to implement one or more of the functions described below in relation to FIG. 12, including, e.g., block 1200, 1202, and/or 1204.

And further, the computer-readable storage medium 806 may store computer-executable code that includes mTRP CJT signaling instructions 1052 that configure a network node 1000 for various functions, including, e.g., transmitting a respective reference signal from each of a plurality of TRPs; receiving a first message comprising a recommended set of TRPs from among the plurality of TRPs for use in CJT based on the respective reference signals; and receiving a second message comprising a CSI report based on a transmission hypothesis corresponding to the recommended set of TRPs or an override set of TRPs from among the plurality of TRPs for use in CJT. For example, the mTRP CJT signaling instructions 1052 may be configured to cause a network node 1000 to implement one or more of the functions described below in relation to FIG. 11, including, e.g., blocks 1100, 1102, and/or 1104. The mTRP CJT signaling instructions 1052 may further be configured to cause a network node 1000 to implement one or more of the functions described below in relation to FIG. 12, including, e.g., blocks 1200, 1202 and/or 1204.

In one configuration, an apparatus (e.g., network node 1000) for wireless communication includes means for transmitting a respective reference signal from each of a plurality of TRPs; means for receiving a first message comprising a recommended set of TRPs from among the plurality of TRPs for use in CJT based on the respective reference signals; and means for receiving a second message comprising a CSI report based on a transmission hypothesis corresponding to the recommended set of TRPs or an override set of TRPs from among the plurality of TRPs for use in CJT. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGs. of this disclosure and utilizing, for example, the processes and/or algorithms described herein in relation to FIGS. 11 and/or 12.

FIG. 11 is a flow diagram illustrating exemplary techniques for mTRP CJT signaling in accordance with some aspects of the present disclosure. As described below, a particular implementation may omit some or all illustrated features, and may not require some illustrated features to implement all embodiments. In some examples, the scheduled entity 900 (e.g., any UE of this disclosure, such as UE 706) illustrated in FIG. 9 may be configured to carry out these techniques. In some examples, any suitable apparatus or means for carrying out the functions or algorithm described below may carry out these techniques.

The scheduled entity 900 may receive a respective reference signal from each of a plurality of TRPs (1100). For example, the UE 706 may receive the CSI-RS 804 from the TRPs 701-704 of the gNB 708.

The scheduled entity 900 may transmit a first message including a recommended set of TRPs from among the plurality of TRPs for use in CJT based on the respective reference signals (1102). For example, the UE 706 may transmit a UE recommendation for N and/or preferred TRPs 806 which may include the recommended set of TRPs from among the TRPs 701-704 to be used for CJT communication. The UE 706 may determine the recommended set of TRPs based on the CSI-RS 804.

The scheduled entity 900 may transmit a second message including a CSI report based on the transmission hypothesis (1104). The transmission hypothesis may be based on the recommended set of TRPs or an override set of TRPs from among the plurality of TRPs for use in CJT. For example, the UE 706 may receive an ACK from the gNB 708 in response to the first message or not receive a response message from the gNB 708. In such instances, the UE 706 may determine to base the transmission hypothesis on the recommended set of TRPs. If the UE 706 receives a response message that includes a NACK, an override set of TRPs, or other information indicative of the gNB 708 rejecting the recommended set of TRPs from the first message, the UE 706 may determine to base the transmission hypothesis a set of TRPs that is different than (e.g., not identical to) the recommended set of TRPs, such as the override set of TRPs. For example, the UE 706 may compile a CSI report based on the transmission hypothesis that would include the use of the recommended set of TRPs for CJT communication between the gNB 708 and the UE 706 or the override set of TRPs for CJT communication between the gNB 708 and the UE 706.

In some examples, the first message includes at least one of: a recommended number of the TRPs, or at least one identifier indicating which TRPs are in the recommended set of TRPs. In some examples, the first message includes a beam selection report with group-based beam reporting enabled. In some examples, the first message further includes a set of CSI-RS Resource IDs (CRIs) corresponding to CSI-RS transmissions from the TRPs in the recommended set of TRPs. In some examples, the first message further comprises an information element configured to indicate that the beam selection report provides the recommended set of TRPs for use in CJT. In some examples, the information element includes one of RSRP or SINR values being set to a predetermined value, e.g., 0.

In some examples, the first message (e.g., UE recommendation for N and/or preferred TRPs 806) includes a dedicated message for carrying the recommended set of TRPs for use in CJT. In some examples, the first message includes a bitmap having a value that maps to the recommended set of TRPs. In some examples, scheduled entity may receive a response message (e.g., ACK/NACK and/or N and/or preferred TRPs 808) including a response to the first message to acknowledge or to modify the recommended set of TRPs for use in CJT. In some examples, the response to the first message is to modify the recommended set of TRPs for use in CJT and wherein the response message further includes the override set of TRPs.

In some examples, the scheduled entity 900 transmitting the second message is automatic and occurs after a predetermined number of slots after transmitting the first message. In some examples, the scheduled entity 900 starts a timer upon transmitting the first message. In some examples, the scheduled entity 900 determines an expiry of the timer. In some examples, the scheduled entity 900 determines that a response message has not been received prior to expiry of the timer. In some examples, transmitting the second message is based on the response message not being received prior to expire of the timer. In some examples, the scheduled entity 900 retransmits the first message based on response message not being received prior to expiry of the timer.

Figure 12:
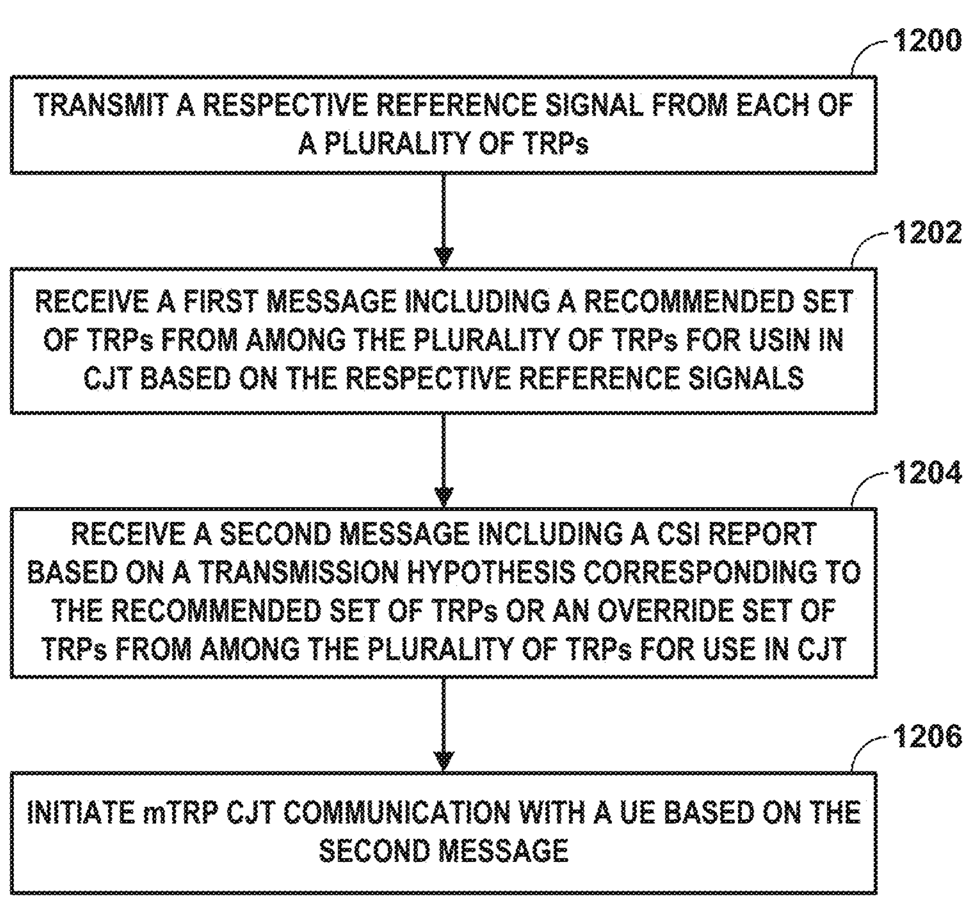
FIG. 12 is a flow diagram illustrating additional exemplary techniques for mTRP CJT signaling in accordance with some aspects of the present disclosure.

FIG. 12 is a flow diagram illustrating additional exemplary techniques for mTRP CJT signaling in accordance with some aspects of the present disclosure. As described below, a particular implementation may omit some or all illustrated features, and may not require some illustrated features to implement all embodiments. In some examples, the network node 1000 (e.g., any gNB or base station of this disclosure, such as gNB 708) illustrated in FIG. 10 may be configured to carry out these techniques. In some examples, any suitable apparatus or means for carrying out the functions or algorithm described below may carry out these techniques.

The network node 1000 may transmit a respective reference signal from each of a plurality of TRPs (1200). For example, the gNB 708 may transmit a respective reference signal (e.g., collectively CSI-RS 804) from each of the TRPs 701-704. The network node 1000 may receive a first message including a recommended set of TRPs from among the plurality of TRPs for use in CJT based on the respective reference signals (1202). For example, the gNB 708 may receive the UE recommendation for N and/or preferred TRPs 806 from the UE 706. The network node 1000 may receive a second message including a CSI report based on a transmission hypothesis corresponding to the recommended set of TRPs or an override set of TRPs from among the plurality of TRPs for use in CJT (1204). For example, the gNB 708 may receive CSI report with CJT involving N TRPs hypothesis 810 from the UE 706. The network node 1000 may initiate mTRP CJT communication with a UE based on the second message (1206). For example, the gNB 708 may begin mTRP CJT communication with the UE 706 using the TRPs of the TRPs 701-704 upon which the transmission hypothesis in the second message was based.

In some examples, the first message (e.g., UE recommendation for N and/or preferred TRPs 806) includes at least one of: a recommended number of the TRPs, or at least one identifier indicating which TRPs among the plurality of TRPs are recommended for use in CJT. In some examples, the first message includes a beam selection report with group-based beam reporting enabled. In some examples, the first message further includes a set of CSI-RS Resource IDs (CRIs) corresponding to CSI-RS transmissions from the TRPs in the recommended set of TRPs. In some examples, the first message includes a most recently received beam selection report with group-based beam reporting enabled. In some examples, the first message further includes an information element configured to indicate that the beam selection report provides the recommended set of TRPs for use in CJT. In some examples, the information element includes one of RSRP or SINR values being set to a predetermined value, e.g., 0.

In some examples, the first message includes a dedicated message for carrying the recommended set of TRPs for use in CJT. In some examples, the first message includes a bitmap having a value that maps to the recommended set of TRPs.

In some examples, the network node 1000 may transmit a response message (e.g., ACK/NACK and/or N and/or preferred TRPs 808) including a response to the first message to acknowledge or to modify the recommended set of TRPs for use in CJT. In some examples, the response to the first message is to modify the recommended set of TRPs for use in CJT and wherein the response message further includes the override set of TRPs.

This disclosure includes the following non-limiting clauses.

Clause 1. A method of wireless communication operable at a user equipment (UE), comprising: receiving a respective reference signal from each of a plurality of transmission reception points (TRPs); transmitting a first message comprising a recommended set of TRPs from among the plurality of TRPs for use in coherent joint transmission (CJT) based on the respective reference signals; and transmitting a second message comprising a channel state information (CSI) report based on a transmission hypothesis, wherein the transmission hypothesis is based on the recommended set of TRPs or an override set of TRPs from among the plurality of TRPs for use in CJT.

Clause 2. The method of clause 1, wherein the first message comprises at least one of: a recommended number of the TRPs, or at least one identifier indicating which TRPs are in the recommended set of TRPs.

Clause 3. The method of clause 1 or 2, wherein the first message comprises a beam selection report with group-based beam reporting enabled.

Clause 4. The method of clause 3, wherein the first message further comprises a set of CSI-RS Resource IDs (CRIs) corresponding to CSI-RS transmissions from TRPs in the recommended set of TRPs.

Clause 5. The method of clause 3, wherein the first message further comprises an information element configured to indicate that the beam selection report provides the recommended set of TRPs for use in CJT.

Clause 6. The method of clause 5, wherein the information element comprises one of Reference Signal Received Power (RSRP) or Signal Interference+Noise Ratio (SINR) values being set to a predetermined value.

Clause 7. The method of clause 1, wherein the first message comprises a dedicated message for carrying the recommended set of TRPs for use in CJT.

Clause 8. The method of any of clauses 1-7, wherein the first message comprises a bitmap having a value that maps to the recommended set of TRPs.

Clause 9. The method of any of clauses 1-8, further comprising: receiving a response message comprising a response to the first message to acknowledge or to modify the recommended set of TRPs for use in CJT.

Clause 10. The method of clause 9, wherein the response to the first message is to modify the recommended set of TRPs for use in CJT and wherein the response message further comprises the override set of TRPs.

Clause 11. The method of any of clauses 1-10, wherein transmitting the second message is automatic and occurring after a predetermined number of slots after transmitting the first message.

Clause 12. The method of any of clauses 1-11, further comprising: starting a timer upon transmitting the first message; and determining an expiry of the timer, wherein transmitting the second message is based on the response message not being received prior to the expiry of the timer.

Clause 13. The method of clause 12, further comprising retransmitting the first message based on the response message not being received prior to expiry of the timer.

Clause 14. A method of wireless communication at a network node, comprising: transmitting a respective reference signal from each of a plurality of transmission reception points (TRPs); receiving a first message comprising a recommended set of TRPs from among the plurality of TRPs for use in coherent joint transmission (CJT) based on the respective reference signals; receiving a second message comprising a channel state information (CSI) report based on a transmission hypothesis corresponding to the recommended set of TRPs or an override set of TRPs from among the plurality of TRPs for use in CJT; and initiating multiple TRP (mTRP) CJT communication with a user equipment (UE) based on the second message.

Clause 15. The method of clause 14, wherein the first message comprises at least one of: a recommended number of the TRPs, or at least one identifier indicating which TRPs among the plurality of TRPs are recommended for use in CJT.

Clause 16. The method of clause 14 or 15, wherein the first message comprises a beam selection report with group-based beam reporting enabled.

Clause 17. The method of clause 16, wherein the first message further comprises a set of CSI-RS Resource IDs (CRIs) corresponding to CSI-RS transmissions from the TRPs in the recommended set of TRPs.

Clause 18. The method of clause 16, wherein the first message comprises a most recently received beam selection report with group-based beam reporting enabled.

Clause 19. The method of clause 16, wherein the first message further comprises an information element configured to indicate that the beam selection report provides the recommended set of TRPs for use in CJT.

Clause 20. The method of clause 19, wherein the information element comprises one of Reference Signal Received Power (RSRP) or Signal Interference+Noise Ratio (SINR) values being set to a predetermined value.

Clause 21. The method of clause 14, wherein the first message comprises a dedicated message for carrying the recommended set of TRPs for use in CJT.

Clause 22. The method of any of clauses 14-21, wherein the first message comprises a bitmap having a value that maps to the recommended set of TRPs.

Clause 23. The method of any of clauses 14-22, further comprising: transmitting a response message comprising a response to the first message to acknowledge or to modify the recommended set of TRPs for use in CJT.

Clause 24. The method of clause 23, wherein the response to the first message is to modify the recommended set of TRPs for use in CJT and wherein the response message further comprises the override set of TRPs.

Clause 25. A wireless communication device, comprising: one or more processors; one or more transceivers coupled to the one or more processors; and memory coupled to the one or more processors, wherein the one or more processors are configured to cause the wireless communication device to: receive a respective reference signal from each of a plurality of transmission reception points (TRPs); transmit a first message comprising a recommended set of TRPs from among the plurality of TRPs for use in coherent joint transmission (CJT) based on the respective reference signals; and transmit a second message comprising a channel state information (CSI) report based on a transmission hypothesis, wherein the transmission hypothesis is based on the recommended set of TRPs or an override set of TRPs from among the plurality of TRPs for use in CJT.

Clause 26. The device of clause 25, wherein the first message comprises at least one of: a recommended number of the TRPs, or at least one identifier indicating which TRPs are in the recommended set of TRPs.

Clause 27. The device of clause 25 or 26, wherein the first message comprises a beam selection report with group-based beam reporting enabled.

Clause 28. The device of clause 27, wherein the first message further comprises a set of CSI-RS Resource IDs (CRIs) corresponding to CSI-RS transmissions from TRPs in the recommended set of TRPs.

Clause 29. The device of clause 27, wherein the first message further comprises an information element configured to indicate that the beam selection report provides the recommended set of TRPs for use in CJT.

Clause 30. A network node for wireless communication, the network node comprising: one or more processors; one or more transceivers coupled to the one or more processors; and memory coupled to the one or more processors, wherein the one or more processors are configured to cause the network node to: transmit a respective reference signal from each of a plurality of transmission reception points (TRPs); receive a first message comprising a recommended set of TRPs from among the plurality of TRPs for use in coherent joint transmission (CJT) based on the respective reference signals; receive a second message comprising a channel state information (CSI) report based on a transmission hypothesis corresponding to the recommended set of TRPs or an override set of TRPs from among the plurality of TRPs for use in CJT; and initiate multiple TRP (mTRP) CJT communication with a user equipment (UE) based on the second message.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes certain aspects and examples with reference to some illustrations, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

By way of example, various aspects of this disclosure may be implemented within systems defined by 3GPP, such as fifth-generation New Radio (5G NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word “exemplary” to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The present disclosure uses the terms “coupled” and/or “communicatively coupled” to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms “circuit” and “circuitry” broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; a, b and c; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE), comprising:

receiving a respective reference signal from each of a plurality of transmission reception points (TRPs);

transmitting a first message comprising a bitmap having a value that maps to a recommended set of TRPs from among the plurality of TRPs for use in coherent joint transmission (CJT) based on the respective reference signals; and transmitting, after transmitting the first message, a second message comprising a channel state information (CSI) report based on a transmission hypothesis, wherein the transmission hypothesis is based on the recommended set of TRPs or an override set of TRPs from among the plurality of TRPs for use in CJT.

2. The method of claim 1, wherein the first message comprises at least one of: a recommended number of the TRPs, or at least one identifier indicating which TRPs are in the recommended set of TRPs.

3. The method of claim 1, wherein the first message comprises a beam selection report with group-based beam reporting enabled.

4. The method of claim 3, wherein the first message further comprises a set of CSI-RS Resource IDs (CRIs) corresponding to CSI-RS transmissions from TRPs in the recommended set of TRPs.

5. The method of claim 3, wherein the first message further comprises an information element configured to indicate that the beam selection report provides the recommended set of TRPs for use in CJT.

6. The method of claim 5, wherein the information element comprises one of Reference Signal Received Power (RSRP) or Signal Interference+Noise Ratio (SINR) values being set to a predetermined value.

7. The method of claim 1, wherein the first message comprises a dedicated message for carrying the recommended set of TRPs for use in CJT.

8. The method of claim 1, further comprising:

receiving, prior to transmitting the second message, a response message comprising a response to the first message to acknowledge or to modify the recommended set of TRPs for use in CJT.

9. The method of claim 8, wherein the response to the first message is to modify the recommended set of TRPs for use in CJT and wherein the response message further comprises the override set of TRPs.

10. The method of claim 1, wherein transmitting the second message is automatic and occurring after a predetermined number of slots after transmitting the first message.

11. The method of claim 1, further comprising:

starting a timer upon transmitting the first message; and determining an expiry of the timer, wherein transmitting the second message is based on a response message not being received prior to the expiry of the timer.

12. The method of claim 11, further comprising retransmitting the first message based on the response message not being received prior to expiry of the timer.

13. A method of wireless communication at a network node, comprising:

transmitting a respective reference signal from each of a plurality of transmission reception points (TRPs);

receiving a first message comprising a bitmap having a value that maps to a recommended set of TRPs from among the plurality of TRPs for use in coherent joint transmission (CJT) based on the respective reference signals;

receiving, after receiving the first message, a second message comprising a channel state information (CSI) report based on a transmission hypothesis corresponding to the recommended set of TRPs or an override set of TRPs from among the plurality of TRPs for use in CJT; and initiating multiple TRP (mTRP) CJT communication with a user equipment (UE) based on the second message.

14. The method of claim 13, wherein the first message comprises at least one of: a recommended number of the TRPs, or at least one identifier indicating which TRPs among the plurality of TRPs are recommended for use in CJT.

15. The method of claim 13, wherein the first message comprises a beam selection report with group-based beam reporting enabled.

16. The method of claim 15, wherein the first message further comprises a set of CSI-RS Resource IDs (CRIs)

corresponding to CSI-RS transmissions from the TRPs in the recommended set of TRPs.

17. The method of claim 15, wherein the first message comprises a most recently received beam selection report with group-based beam reporting enabled.

18. The method of claim 15, wherein the first message further comprises an information element configured to indicate that the beam selection report provides the recommended set of TRPs for use in CJT.

19. The method of claim 18, wherein the information element comprises one of Reference Signal Received Power (RSRP) or Signal Interference+Noise Ratio (SINR) values being set to a predetermined value.

20. The method of claim 13, wherein the first message comprises a dedicated message for carrying the recommended set of TRPs for use in CJT.

21. The method of claim 13, further comprising:

transmitting, prior to receiving the second message, a response message comprising a response to the first message to acknowledge or to modify the recommended set of TRPs for use in CJT.

22. The method of claim 21, wherein the response to the first message is to modify the recommended set of TRPs for use in CJT and wherein the response message further comprises the override set of TRPs.

23. A wireless communication device, comprising:

one or more processors;

one or more transceivers coupled to the one or more processors; and memory coupled to the one or more processors, wherein the one or more processors are configured to cause the wireless communication device to:

receive a respective reference signal from each of a plurality of transmission reception points (TRPs);

transmit a first message comprising a bitmap having a value that maps to a recommended set of TRPs from among the plurality of TRPs for use in coherent joint transmission (CJT) based on the respective reference signals; and transmit, after transmitting the first message, a second message comprising a channel state information (CSI) report based on a transmission hypothesis, wherein the transmission hypothesis is based on the recommended set of TRPs or an override set of TRPs from among the plurality of TRPs for use in CJT.

24. The device of claim 23, wherein the first message comprises at least one of: a recommended number of the TRPs, or at least one identifier indicating which TRPs are in the recommended set of TRPs.

25. The device of claim 23, wherein the first message comprises a beam selection report with group-based beam reporting enabled.

26. The device of claim 25, wherein the first message further comprises a set of CSI-RS Resource IDs (CRIs) corresponding to CSI-RS transmissions from TRPs in the recommended set of TRPs.

27. The device of claim 25, wherein the first message further comprises an information element configured to indicate that the beam selection report provides the recommended set of TRPs for use in CJT.

28. A network node for wireless communication, the network node comprising:

one or more processors;

one or more transceivers coupled to the one or more processors; and memory coupled to the one or more processors, wherein the one or more processors are configured to cause the network node to:

transmit a respective reference signal from each of a plurality of transmission reception points (TRPs);

receive a first message comprising a bitmap having a value that maps to a recommended set of TRPs from among the plurality of TRPs for use in coherent joint transmission (CJT) based on the respective reference signals;

receive, after receiving the first message, a second message comprising a channel state information (CSI) report based on a transmission hypothesis corresponding to the recommended set of TRPs or an override set of TRPs from among the plurality of TRPs for use in CJT; and initiate multiple TRP (mTRP) CJT communication with a user equipment (UE) based on the second message.

29. The method of claim 1, wherein the bitmap identifies the recommended set of TRPs.

30. The method of claim 13, wherein the bitmap identifies the recommended set of TRPs.

* * * * *